US006501602B2

(12) United States Patent
Togino et al.

(10) Patent No.: US 6,501,602 B2
(45) Date of Patent: Dec. 31, 2002

(54) IMAGE DISPLAY APPARATUS HAVING THREE-DIMENSIONALLY DECENTERED OPTICAL PATH

(75) Inventors: Takayoshi Togino, Koganei (JP); Tetsuo Nagata, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/921,426

(22) Filed: Aug. 3, 2001

(65) Prior Publication Data

US 2002/0051299 A1 May 2, 2002

(30) Foreign Application Priority Data

Aug. 8, 2000 (JP) ........................................ 2000-239630

(51) Int. Cl.[7] .............................................. G02B 27/14
(52) U.S. Cl. ...................... 359/631; 359/632; 359/633; 359/637
(58) Field of Search ................................ 359/630, 631, 359/632, 633, 636, 637, 638, 639, 640; 345/7, 8

(56) References Cited

U.S. PATENT DOCUMENTS

| | | | | |
|---|---|---|---|---|
| 3,680,946 A | * | 8/1972 | Bellows | 356/12 |
| 5,198,928 A | * | 3/1993 | Chauvin | 359/465 |
| 5,392,158 A | | 2/1995 | Tosaki | 359/633 |
| 5,712,649 A | | 1/1998 | Tosaki | 345/8 |
| 5,739,955 A | | 4/1998 | Marshall | 359/631 |
| 2001/0005185 A1 | * | 6/2001 | Endo et al. | 345/8 |

FOREIGN PATENT DOCUMENTS

| | | |
|---|---|---|
| JP | 07-287185 | 10/1995 |
| JP | 9-61748 | 3/1997 |
| JP | 09-181998 | 7/1997 |
| JP | 09-181999 | 7/1997 |

* cited by examiner

*Primary Examiner*—Ricky Mack
(74) *Attorney, Agent, or Firm*—Pillsbury Winthrop LLP

(57) ABSTRACT

An image display apparatus allows an image from a single image display device to be led to two eyes without using a half-mirror, thereby allowing observation of a bright image, and facilitates correction of various aberrations. A viewing optical system includes a left ocular part, a right ocular part, and an optical path distributing part for leading a light beam from a single image display device to the left and right ocular parts. The left and right ocular parts each have at least two reflecting surfaces. The optical path distributing part has at least one pair of reflecting surfaces for left and right optical paths. These reflecting surfaces are formed from rotationally asymmetric curved reflecting surfaces having the function of correcting decentration aberrations. The left and right optical paths of the viewing optical system are formed by optical surfaces arranged so that the left and right optical paths are not in plane symmetry with each other but in 180-degree rotational symmetry with respect to only a normal line passing through the center of the image display device.

28 Claims, 10 Drawing Sheets

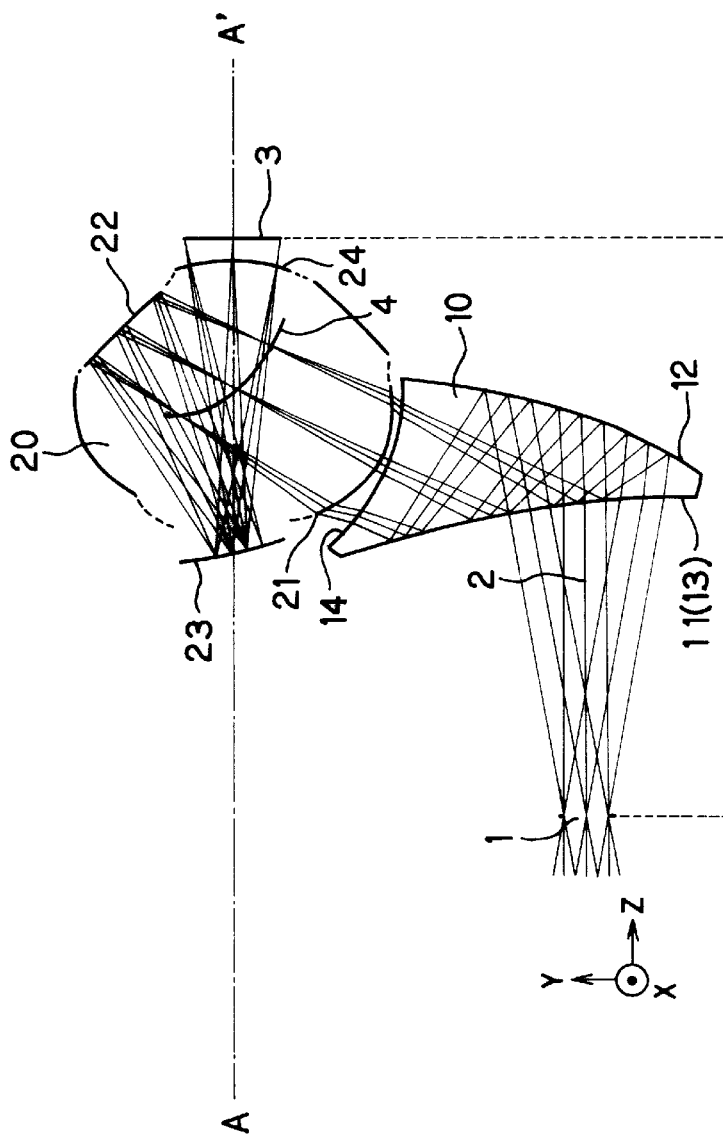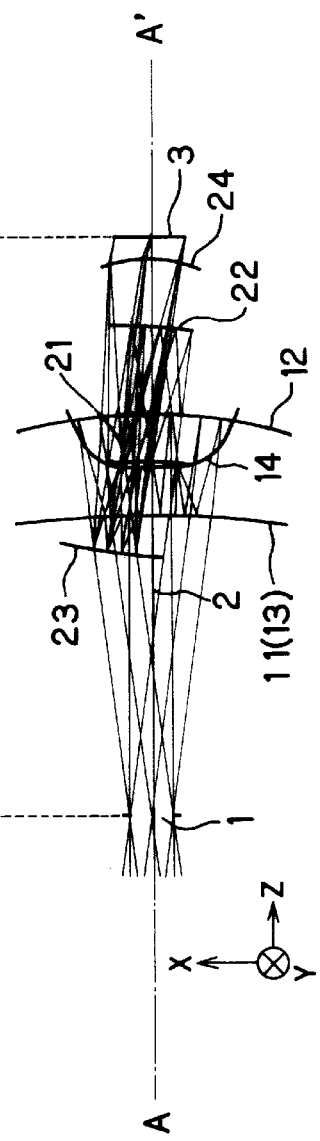
FIG. 3(a)
FIG. 3(b)

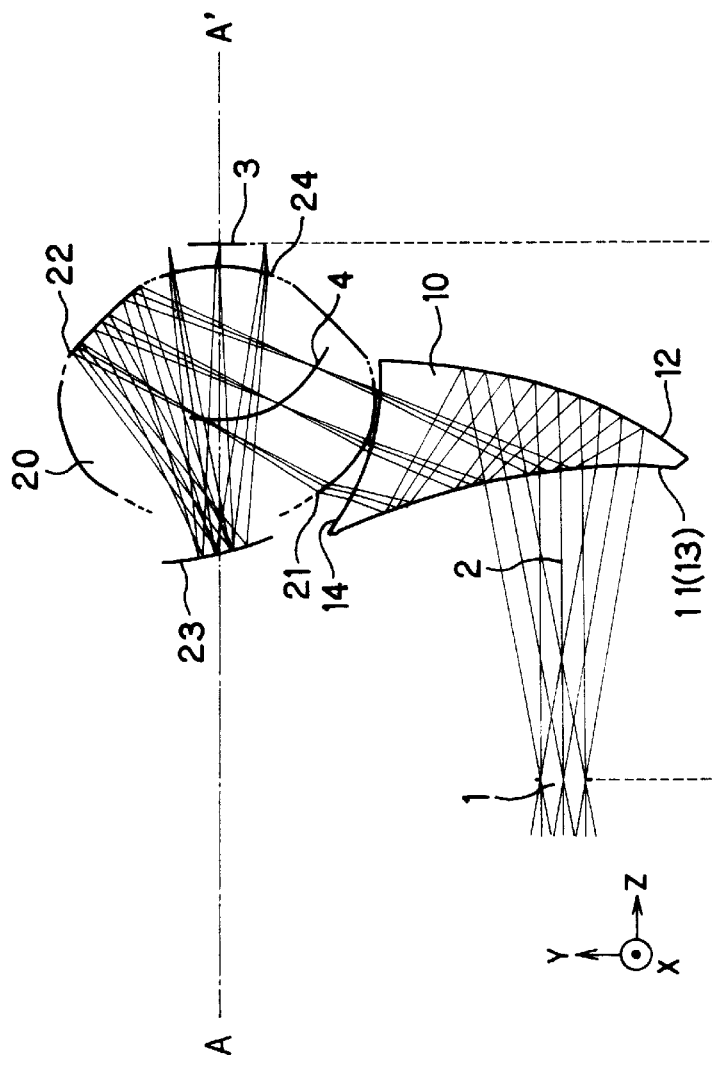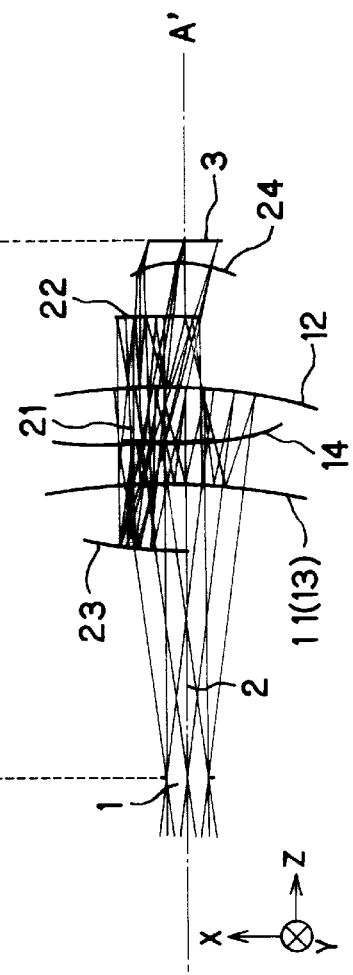
FIG. 4(a)
FIG. 4(b)

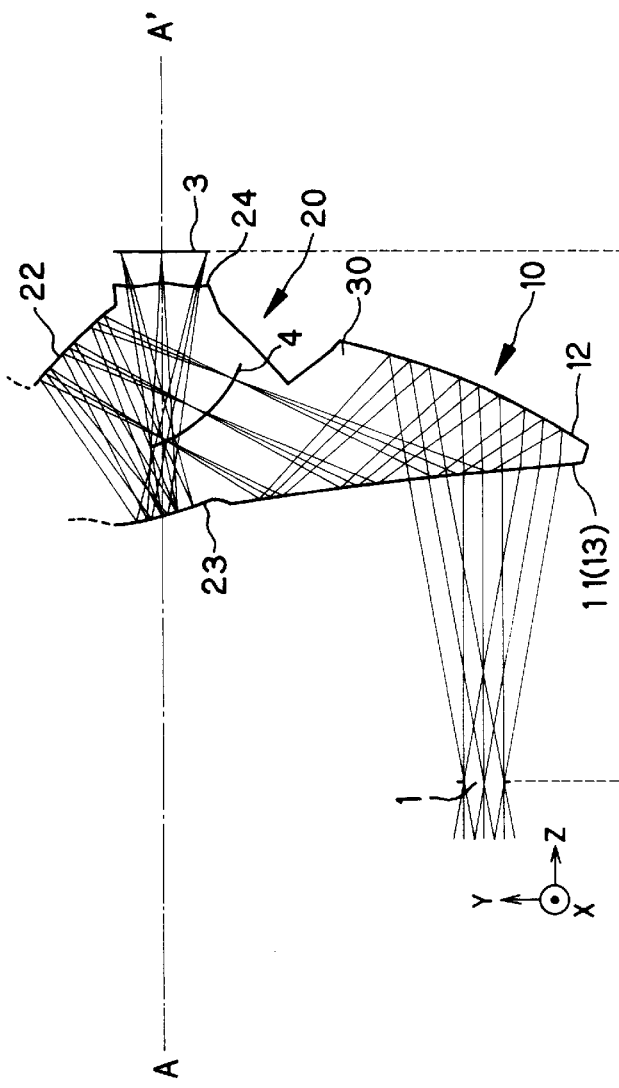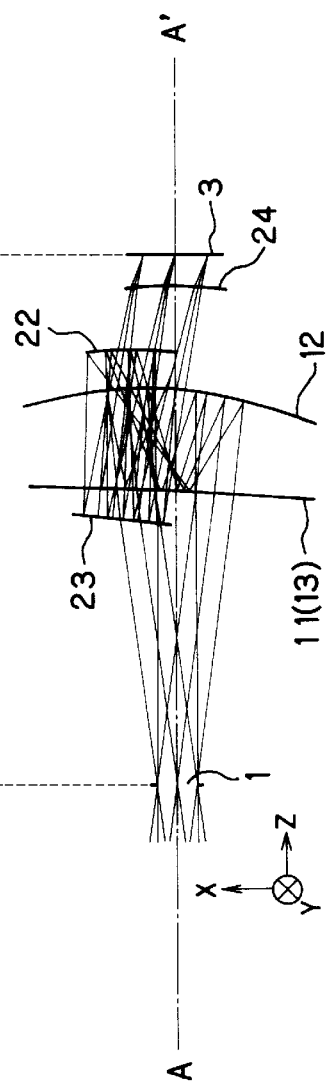
FIG. 5(a)
FIG. 5(b)

IMAGE DISPLAY APPARATUS HAVING THREE-DIMENSIONALLY DECENTERED OPTICAL PATH

This application claims benefit of Japanese Application No. 2000-239630 filed in Japan on Aug. 8, 2000, the contents of which are incorporated by this reference.

BACKGROUND OF THE INVENTION

1. Field of the Invention

The present invention relates to image display apparatus having a three-dimensionally decentered optical path. More particularly, the present invention relates to a head- or face-mounted image display apparatus that can be retained on an observer's head or face and allows observation of the image of a single image display device with two eyes.

2. Discussion of Related Art

Image display apparatus designed to observe the image of a single image display device with two eyes have heretofore been known in Japanese Patent Application Unexamined Publication Nos. [hereinafter referred to as "JP(A)"] 6-110013, 7-287185, 9-61748, 9-181998, and 9-181999, Published Japanese Translation of PCT International Publication No. Hei 10-504115, etc.

Among them, the image display apparatus of JP(A) 6-110013 splits and folds light rays by using a prism in the shape of an isosceles triangular prism and a mirror. Therefore, correction of various aberrations is performed by using a lens placed in front of the pupil. This makes it difficult to correct aberrations, and at the same time, causes the apparatus to become large in size. JP(A) 7-287185 uses a plurality of mirrors and performs image formation with a single convex lens. Therefore, it is very difficult to perform assembly adjustment. In addition, appropriate performance cannot be attained. Although the image display device is placed three dimensionally, the optical systems for the left and right eyes are in bilateral symmetry with each other. Therefore, the images of the image display device that are displayed in the left and right eyes are in oppositely rotated relation to each other.

In JP(A) 9-61748, display light from an LCD (Liquid Crystal Display) is split by using a half-mirror so as to be observed with two eyes. Because the display light is distributed to the left and right eyeballs, the image for observation is weak in light intensity and hence dark. In JP(A) 9-181998 and 9-181999, optical paths for two eyes are provided sidewardly of the image display device. Therefore, the tilt angle of the principal rays with respect to the image display device is very large. Accordingly, these apparatus cannot use an ordinary LCD (Liquid Crystal Display) because the viewing angle thereof is not sufficiently wide.

The image display apparatus of Published Japanese Translation of PCT International Publication No. Hei 10-504115 splits display light by using a half-mirror. The image display apparatus has a very large number of components and requires a very complicated assembling operation.

Recently, with the achievement of small-sized image display devices, it has become necessary to reduce the focal length of the viewing optical system in order to ensure the same field angle. However, if the focal length is shortened, it becomes difficult to ensure the required back focus, and it becomes impossible to increase the optical path length within the prism. As a result, it becomes impossible to increase the number of reflecting surfaces and hence impossible to correct decentration aberrations satisfactorily.

Further, with the recent development of manufacturing techniques, image display devices are becoming higher in definition year by year.

SUMMARY OF THE INVENTION

The present invention was made in view of the above-described problems with the prior art.

Accordingly, an object of the present invention is to provide an image display apparatus, e.g. a head-mounted image display apparatus, in which an image from a single image display device is led to two eyes without using a half-mirror, thereby allowing observation of a bright image, and in which at least three curved reflecting surfaces are used to form an optical system, thereby allowing correction of various aberrations in conformity to recent compact and high-definition image display devices.

Another object of the present invention is to provide an image display apparatus favorably improved in terms of the tilt angle of the principal rays with respect to the image display device.

To attain the above-described objects, the present invention provides an image display apparatus having a three-dimensionally decentered optical path. The image display apparatus includes an image display device for forming an image for observation on an image display area. The image display apparatus further includes a viewing optical system for leading the image formed by the image display device to a pupil corresponding to a position where an eyeball of an observer is to be placed.

The image display device is a single image display device having a plurality of pixels juxtaposed on a single substrate.

Each pixel located at least in the central portion of the single image display device is arranged to emit an image light beam at such an exit angle that the light beam can be led to the left and right eyes of the observer.

The viewing optical system includes at least a left ocular part for leading the light beam to the left eye of the observer; a right ocular part for leading the light beam to the right eye of the observer; and an optical path distributing part for distributing the image light beam emitted from the image display device at the above-described exit angle to the left and right ocular parts.

The left ocular part has at least two reflecting surfaces. At least one of the at least two reflecting surfaces is formed from a rotationally asymmetric curved reflecting surface having the function of correcting decentration aberrations.

The right ocular part has at least two reflecting surfaces. At least one of the at least two reflecting surfaces is formed from a rotationally asymmetric curved reflecting surface having the function of correcting decentration aberrations.

The optical path distributing part has at least one pair of reflecting surfaces for left and right optical paths for the left and right eyes of the observer. The reflecting surfaces are each formed from a rotationally asymmetric curved reflecting surface having the function of correcting decentration aberrations.

The left and right optical paths of the viewing optical system are formed by optical surfaces arranged so that the left and right optical paths are not in plane symmetry with each other but in 180-degree rotational symmetry with respect to only a normal line passing through the center of the image display device.

The reasons for adopting the above-described arrangement in the present invention, together with the function thereof, will be described below.

FIG. 1 shows the left and right optical paths (for the left and right eyes) and optical surfaces of the viewing optical system in the image display apparatus according to Example 1 (described later). Part (a) of FIG. 1 is a plan view. Part (b) of FIG. 1 is a side view. In the figure, L and R are suffixed to reference symbols to distinguish between the left and right optical surfaces, axial principal rays and pupils. The reference symbols are put to the constituent elements in the order of backward ray tracing to match with the description of numerical data (shown later).

The viewing optical system includes a left ocular part 10L for leading a light beam to an observer's left eye positioned at a left pupil 1L and a right ocular part 10R for leading a light beam to an observer's right eye positioned at a right pupil 1R. The viewing optical system further includes an optical path distributing part (optical path distributing prism in Example 1, which is shown in FIG. 1) 20 for leading an image light beam emitted from an image display device 3 at a predetermined exit angle to the left and right ocular parts 10L and 10R.

The left and right ocular parts 10L and 10R each have at least two reflecting surfaces (back-coated mirrors 12L and 12R and totally reflecting surfaces 13L and 13R in the case of FIG. 1). At least one of the at least two reflecting surfaces is formed from a rotationally asymmetric curved reflecting surface having the function of correcting decentration aberrations.

In the present invention, a free-form surface is used as a typical example of a surface having a rotationally asymmetric curved surface configuration. A free-form surface is defined by the following equation. The Z-axis of the defining equation is the axis of a free-form surface.

$$Z = cr^2/\left[1 + \sqrt{\{1-(1+k)c^2r^2\}}\right] + \sum_{j=2}^{66} C_j X^m Y^n \quad (a)$$

In the equation (a), the first term is a spherical surface term, and the second term is a free-form surface term.

In the spherical surface term:
c: the curvature at the vertex
k: a conic constant
$r = \sqrt{(X^2 + Y^2)}$
The free-form surface term is given by $$\sum_{j=2}^{66} C_j X^m Y^n = C_2 X + C_3 Y + C_4 X^2 + C_5 XY + C_6 Y^2 +$$

$$C_7 X^3 + C_8 X^2 Y + C_9 XY^2 + C_{10} Y^3 + C_{11} X^4 + C_{12} X^3 Y +$$

$$C_{13} X^2 Y^2 + C_{14} XY^3 + C_{15} Y^4 + C_{16} X^5 + C_{17} X^4 Y + C_{18} X^3 Y^2 +$$

$$C_{19} X^2 Y^3 + C_{20} XY^4 + C_{21} Y^5 + C_{22} X^6 + C_{23} X^5 Y + C_{24} X^4 Y^2 +$$

$$C_{25} X^3 Y^3 + C_{26} X^2 Y^4 + C_{27} XY^5 + C_{28} Y^6 + C_{29} Y^7 + C_{30} X^6 Y +$$

$$C_{31} X^5 Y^2 + C_{32} X^4 Y^3 + C_{33} X^3 Y^4 + C_{34} X^2 Y^5 + C_{35} XY^6 + C_{36} Y^7$$

where $C_j$ (j is an integer of 2 or higher) are coefficients.

In general, the above-described free-form surface does not have planes of symmetry in both the XZ- and YZ-planes. However, a free-form surface having only one plane of symmetry parallel to the YZ-plane is obtained by making all terms of odd-numbered degrees with respect to X zero. A free-form surface having only one plane of symmetry parallel to the XZ-plane is obtained by making all terms of odd-numbered degrees with respect to Y zero.

In addition, free-form surfaces as the above-described surfaces with a rotationally asymmetric curved surface configuration may be defined by Zernike polynomials. That is, the configuration of a free-form surface may be defined by the following equation (b). The Z-axis of the defining equation (b) is the axis of Zernike polynomial. A rotationally asymmetric surface is defined by polar coordinates of the height of the Z-axis with respect to the XY-plane. In the equation (b), R is the distance from the Z-axis in the XY-plane, and A is the azimuth angle about the Z-axis, which is expressed by the angle of rotation measured from the X-axis.

$x = R \times \cos(A)$
$y = R \times \sin(A)$ $$Z = D_2 + D_3 R\cos(A) + D_4 R\sin(A) + D_5 R^2\cos(2A) + \quad (b)$$
$$D_6(R^2 - 1) + D_7 R^2 \sin(2A) + D_8 R^3 \cos(3A) +$$
$$D_9(3R^3 - 2R)\cos(A) + D_{10}(3R^3 - 2R)\sin(A) +$$
$$D_{11} R^3 \sin(3A) + D_{12} R^4 \cos(4A) +$$
$$D_{13}(4R^4 - 3R^2)\cos(2A) + D_{14}(6R^4 - 6R^2 + 1) +$$
$$D_{15}(4R^4 - 3R^2)\sin(2A) + D_{16} R^4 \sin(4A) +$$
$$D_{17} R^5 \cos(5A) + D_{18}(5R^5 - 4R^3)\cos(3A) +$$
$$D_{19}(10R^5 - 12R^3 + 3R)\cos(A) +$$
$$D_{20}(10R^5 - 12R^3 + 3R)\sin(A) +$$
$$D_{21}(5R^5 - 4R^3)\sin(3A) + D_{22} R^5 \sin(5A) +$$
$$D_{23} R^6 \cos(6A) + D_{24}(6R^6 - 5R^4)\cos(4A) +$$
$$D_{25}(15R^6 - 20R^4 + 6R^2)\cos(2A) +$$
$$D_{26}(20R^6 - 30R^4 + 12R^2 - 1) + D_{27}(15R^6 - 20R^4 +$$
$$6R^2)\sin(2A) + D_{28}(6R^6 - 5R^4)\sin(4A) +$$
$$D_{29} R^6 \sin(6A)$$

where $D_m$ (m is an integer of 2 or higher) are coefficients.

It should be noted that to design an optical system symmetric with respect to the X-axis direction, $D_4$, $D_5$, $D_6$, $D_{10}$, $D_{11}$, $D_{12}$, $D_{13}$, $D_{14}$, $D_{20}$, $D_{21}$, $D_{22}$ . . . should be used.

The above defining equations are shown to exemplify surfaces with a rotationally asymmetric curved surface configuration. Therefore, the same advantageous effects can be obtained for any other defining equation that expresses such a rotationally asymmetric curved surface configuration.

It should be noted that other examples of defining equations for free-form surfaces include the following defining equation (c):

$$Z = \Sigma\Sigma C_{nm} XY$$

Assuming that k=7 (polynomial of degree 7), for example, a free-form surface is expressed by an expanded form of the above equation as follows:

$$Z = C_2 + C_3 Y + C_4|X| + C_5 Y^2 + C_6 Y|X| + C_7 X^2 + C_8 Y^3 + \quad (c)$$
$$C_9 Y^2|X| + C_{10} YX^2 + C_{11}|X^3| + C_{12} Y^4 + C_{13} Y^3|X| +$$
$$C_{14} Y^2 X^2 + C_{15} Y|X^3| + C_{16} X^4 + C_{17} Y^5 + C_{18} Y^4|X| +$$
$$C_{19} Y^3 X^2 + C_{20} Y^2|X^3| + C_{21} YX^4 + C_{22}|X^5| + C_{23} Y^6 +$$
$$C_{24} Y^5|X| + C_{25} Y^4 X^2 + C_{26} Y^3|X^3| + C_{27} Y^2 X^4 +$$

-continued $$C_{28}Y|X^5| + C_{29}X^6 + C_{30}Y^7 + C_{31}Y^6|X| + C_{32}Y^5X^2 +$$
$$C_{33}Y^4|X^3| + C_{34}Y^3X^4 + C_{35}Y^2|X^5| + C_{36}YX^6 + C_{37}|X^7|$$

It should be noted that an anamorphic surface or a toric surface is also usable as a surface having a rotationally asymmetric curved surface configuration.

Referring to FIG. 1 again, the optical path distributing part 20 has at least one pair of reflecting surfaces for left and right optical paths (i.e. a pair of back-coated mirrors 22L and 22R and another pair of back-coated mirror 23L and 23R in the case of FIG. 1). These reflecting surfaces are formed from rotationally asymmetric curved reflecting surfaces having the function of correcting decentration aberrations.

The point of the image display apparatus having a three-dimensionally decentered optical path according to the present invention is as follows.

The left and right optical paths (for the left and right eyes) of the viewing optical system are formed by optical surfaces 11L to 14L, 21L to 23L, 24, 11R to 14R, 21R to 23R and 24 arranged so that the left and right optical paths are not in plane symmetry with each other but in 180-degree rotational symmetry with respect to only a normal line A-A' passing through the center of the image display device 3. In Example 1, the refracting surface (entrance surface) 24 through which the image light beam first enters the optical path distributing prism 20 from the image display device 3 is a surface common to the left and right optical paths.

To form left and right optical paths that are in 180-degree rotational symmetry with each other as stated above, the decentered prisms 10L, 10R and 20 should be arranged as follows. Pairs of optical surfaces (left and right) 11L, 11R; 12L, 12R; 13L, 13R; 14L, 14R; 21L, 21R; 22L, 22R; and 23L, 23R; are arranged and the surface 24 common to the left and right optical paths is formed so that when the optical surfaces 11R to 14R, 21R to 23R and 24, which constitute the optical system for the right optical path, are rotated through 180 degrees about the normal line A-A', these surfaces are coincident with the optical surfaces 11L to 14L, 21L to 23L and 24, which constitute the optical system for the left optical path.

It is desirable that the optical path distributing part 20 should have at least two pairs of reflecting surfaces (left and right) 22L, 22R; and 23L, 23R; and the two pairs of reflecting surfaces should have rotationally asymmetric curved reflecting surfaces having the function of correcting decentration aberrations, as in the case of the example shown in FIG. 1.

Further, the left and right optical paths for the left and right eyes should desirably be arranged so that a plane defined by the optical axis of the axial principal ray incident on the left first reflecting surface 23L closest to the image display device 3 among the left reflecting surfaces in the left optical path of the optical path distributing part 20 and the axial principal ray exiting the left first reflecting surface 23L is not identical with a plane defined by the optical axis of the axial principal ray incident on the right first reflecting surface 23R closest to the image display device 3 among the right reflecting surfaces in the right optical path of the optical path distributing part 20 and the axial principal ray exiting the right first reflecting surface 23R.

If the left and right optical paths for the left and right eyes are not arranged as stated above, the left and right first reflecting surfaces 23L and 23R undesirably interfere with each other. Accordingly, it actually becomes difficult to form left and right optical paths for leading a light beam from the single image display device 3 to the left and right eyes.

Further, it is desirable that the left first reflecting surface 23L closest to the image display device 3 among the reflecting surfaces in the left optical path of the optical path distributing part 20 and the right first reflecting surface 23R closest to the image display device 3 among the reflecting surfaces in the right optical path of the optical path distributing part 20 should be positioned to face the image display device 3 and should be disposed adjacent to each other in a direction [i.e. the X-direction, which is the vertical direction in part (b) of FIG. 1] perpendicular to a plane [i.e. the YZ-plane in part (a) of FIG. 1] containing the centers of the exit pupils 1L and 1R of the left and right optical paths of the viewing optical system and also containing the center of the image display device 3.

In this case, it is desirable that an anti-reflection member should be provided for an area including the boundary portion between the left first reflecting surface 23L and the right first reflecting surface 23R to prevent light rays emitted perpendicularly (in the Z-direction) from the central region of the image display device 3 from being reflected as ghost light, as will be described later.

It should be noted that the viewing optical system, which comprises the ocular parts 10L and 10R and the optical path distributing part 20 as stated above, may be formed from a combination of reflecting mirrors (in Example 5, only the optical path distributing part 20 is formed from a combination of reflecting mirrors). However, the viewing optical system may also be formed from a single prism member [corresponding to Example 4 (described later)] or a plurality of prism members [corresponding to Examples 1 to 3 and 6 (described later); in Example 5, only the ocular parts 10L and 10R are prism members]. In such a case, all of the reflecting surfaces may be back-coated reflecting surfaces formed on the surfaces of the prism members.

The viewing optical system may also be arranged to include, as shown in FIG. 1, an optical path distributing prism 20 constituting the optical path distributing part, and a combination of a left ocular prism 10L constituting the left ocular part and a right ocular prism 10R constituting the right ocular part. The left ocular prism 10L and the right ocular prism 10R are separated from the optical path distributing prism 20 by an air space.

In this case, the optical path distributing prism 20 may include at least the following surfaces. That is, as in the case of the example shown in FIG. 1, an entrance surface 24 is disposed to face the image display device 3 so that both an image light beam forming the left optical path for the left eye and an image light beam forming the right optical path for the right eye enter the optical path distributing prism 20 through the entrance surface 24. The optical path distributing prism 20 further includes a left exit surface 21L through which the light beam of the left optical path exits the optical path distributing prism 20. At least two left reflecting surfaces 23L and 22L are disposed in the optical path between the entrance surface 24 and the left exit surface 21L to reflect the light beam of the left optical path within the optical path distributing prism 20. The optical path distributing prism 20 further includes a right exit surface 21R through which the light beam of the right optical path exits the optical path distributing prism 20. At least two right reflecting surfaces 23R and 22R are disposed in the optical path between the entrance surface 24 and the right exit surface 21R to reflect the light beam of the right optical path within the optical path distributing prism 20. The reflecting surface 23L closest to the entrance surface 24 in the left optical path and the reflecting surface 23R closest to the entrance surface 24 in the right optical path are positioned so as to face both the image display device 3 and the entrance surface 24. Moreover, the reflecting surfaces 23L and 23R are disposed adjacent to each other in a direction [i.e. the X-direction, which is the vertical direction in part (b) of FIG. 1] perpendicular to a plane [i.e. the YZ-plane in part (a) of FIG. 1] containing the centers of the exit pupils 1L and 1R of the left and right optical paths of the viewing optical system and also containing the center of the image display device 3.

Further, it is desirable that a distributed light reinforcing member should be disposed between the image display device and the optical path distributing part so that the light intensity of an image light beam emitted at a predetermined exit angle from each pixel located at least in the central portion of the single image display device is made higher by the distributed light reinforcing member than the intensity of a light beam emitted in a direction perpendicular to the display surface of the image display device.

As shown in FIG. 1, the left and right ocular prisms 10L and 10R may be prisms 10 (suffixes "L" and "R" for distinction between left- and right-side constituent elements are omitted) each having a first surface 14, a second surface 12, and a third surface 11 (13). The first surface 14 is an entrance surface through which a light beam exiting the optical path distributing prism 20 enters the prism 10. The second surface 12 is a reflecting surface for reflecting the light beam entering through the first surface 14 and totally reflected from the third surface 11 (13) within the prism 10 so that the light beam reflected from the second surface 12 is incident on the third surface 11 (13) at an angle smaller than the total reflection critical angle. The third surface 11 (13) is arranged so that the light beam entering the prism 10 through the first surface 14 is incident on the third surface 11 (13) at an angle not smaller than the total reflection critical angle so as to be totally reflected therefrom, and, at the same time, the third surface 11 (13) is an exit surface through which the light beam reflected from the second surface 12 exits the prism 10. This configuration of the prism 10 corresponds to Examples 1 to 3 and 5 (described later).

In this case, the first surface 14 of each of the left and right ocular prisms 10L and 10R may be formed with a rotationally asymmetric curved surface configuration that corrects decentration aberrations. The second surface 12 may also be formed with a rotationally asymmetric curved surface configuration that corrects decentration aberrations.

In this case, it is desirable to arrange the left and right ocular prisms 10L and 10R so that the left axial principal ray exiting the optical path distributing prism 20 intersects, at a desired angle, a plane defined by the left axial principal ray exiting the left ocular prism 10L and the right axial principal ray exiting the right ocular prism 10R.

The left and right ocular prisms 10L and 10R may also be arranged as follows. As shown in Example 6 (described later), the left ocular prism is a prism having first to fourth surfaces. The first surface is an entrance surface through which a light beam exiting the optical path distributing prism enters the prism. The second surface is a reflecting surface for reflecting the light beam entering the prism through the first surface. The third surface is a reflecting surface for reflecting the reflected light beam from the second surface within the prism. The fourth surface is an exit surface through which the light beam reflected from the third surface exits the prism. The right ocular prism is a prism having first to fourth surfaces. The first surface is an entrance surface through which a light beam exiting the optical path distributing prism enters the prism. The second surface is a reflecting surface for reflecting the light beam entering the prism through the first surface. The third surface is a reflecting surface for reflecting the reflected light beam from the second surface within the prism. The fourth surface is an exit surface through which the light beam reflected from the third surface exits the prism. When the optical paths in the left and right ocular prisms are projected onto a plane containing the centers of the exit pupils of the left and right optical paths of the viewing optical system and also containing the center of the image display device, the optical path in each of the ocular prisms rotates within the prism in such a manner as to intersect itself.

In this case, the second surface of each of the left and right ocular prisms may be formed with a rotationally asymmetric curved surface configuration that corrects decentration aberrations. The third surface may also be formed with a rotationally asymmetric curved surface configuration that corrects decentration aberrations.

In this case, it is desirable to arrange the left and right ocular prisms so that the left axial principal ray and the right axial principal ray exiting the optical path distributing prism intersect, at a desired angle, a plane defined by the left axial principal ray exiting the left ocular prism and the right axial principal ray exiting the right ocular prism.

In the foregoing arrangement, it is desirable that the viewing optical system should form an intermediate image of the image displayed by the image display device in the right optical path and also form an intermediate image of the image displayed by the image display device in the left optical path.

The image display device may be rotated through a desired angle about the normal line passing through the center of the image display device as an axis of rotation so that the horizontal direction of the image display area of the image display device is at an angle to a plane containing the centers of the exit pupils of the left and right optical paths of the viewing optical system and also containing the center of the image display device.

In the viewing optical system of the present invention, the surface configuration of each surface of the left and right optical systems is determined so that the optical paths for the left and right eyes are in 180-degree rotational symmetry with respect to only the normal line A-A' passing through the center of the image display device 3, as has been stated above. Accordingly, the left optical system extending from the entrance surface 24 of the optical path distributing part 20 to the exit surface 11L of the left ocular part 10L and the right optical system extending from the entrance surface 24 of the optical path distributing part 20 to the exit surface 11R of the right ocular part 10R are in 180-degree rotational symmetry about the normal line A-A'. Moreover, the left and right optical systems are three-dimensionally decentered reflecting optical systems. Therefore, the relay image (intermediate image) of the image displayed by the image display device 3 is generally rotated through the same angle in the same direction about each optical axis. Accordingly, an image naturally oriented with respect to both the horizontal and vertical directions cannot be observed unless the image display device 3 is rotated in the opposite direction to the direction of rotation of the relay image (intermediate image) through the same angle as the angle of rotation about the normal line A-A' as an axis of rotation so that the horizontal direction of the image display area of the image display device 3 is at an angle to a plane containing the centers of the exit pupils 1L and 1R of the left and right optical paths of the viewing optical system and also containing the center of the image display device 3.

Incidentally, it is desirable to satisfy the following condition:

$$10° < \theta < 120° \quad (1)$$

where θ is the angle formed between the axial principal rays 2L and 2R of left and right light beams led from each pixel located at least in the central portion of the image display device 3 to the left and right eyes of the observer.

The condition (1) needs to be satisfied in order to separate the image light beams for the two eyes appropriately. If θ is not larger than the lower limit, i.e. 10°, the effective diameter portions of the left and right optical surfaces, particularly those of the left and right first reflecting surfaces 23L and 23R closest to the image display device 3 undesirably overlap each other. Accordingly, the optical system has to be increased in size in order to ensure the required effective diameter of each of the left and right first reflecting surfaces 23L and 23R and hence becomes unsuitable for use as the optical system of a head- or face-mounted image display apparatus. Conversely, if θ is not smaller than the upper limit, i.e. 120°, an image display device having very wide viewing angle characteristics is needed to serve as the image display device 3. At the same time, the solid angle of the image light beam becomes small. As a result, it becomes impossible to observe a bright image. Regarding the angle θ, it is preferable to satisfy the following condition:

$$15° < \theta < 100° \quad (1\text{-}1)$$

The above-described image display apparatus can be used as an image pickup apparatus in which an image pickup device is provided in place of the image display device 3 in the above-described arrangement. In this case, the exit pupils 1L and 1R are arranged as entrance pupils through which a light beam from a subject passes, and a subject image is formed on the image pickup device.

Further, the image display apparatus can be used as a projection apparatus in which a projection object is provided in place of the image display device 3 in the foregoing arrangement. A screen is placed in front of the exit pupils 1L and 1R to form a projected image of the projection object on the screen.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 3 is a diagram showing the right optical path (for the right eye) and optical surfaces of the viewing optical system in the image display apparatus according to Example 2 of the present invention, in which part (a) is a plan view, and part (b) is a side view.

FIG. 4 is a diagram showing the right optical path (for the right eye) and optical surfaces of the viewing optical system in the image display apparatus according to Example 3 of the present invention, in which part (a) is a plan view, and part (b) is a side view.

FIG. 5 is a diagram showing the right optical path (for the right eye) and optical surfaces of the viewing optical system in the image display apparatus according to Example 4 of the present invention, in which part (a) is a plan view, and part (b) is a side view.

DESCRIPTION OF THE PREFERRED EMBODIMENTS

The image display apparatus having a three-dimensionally decentered optical path according to the present invention will be described below by way of Examples.

A coordinate system used in the following Examples is defined as follows. The direction of the observer's visual axis (forward direction) is defined as a Z-axis. The horizontal direction of the observer is defined as a Y-axis, and the vertical direction of the observer is defined as an X-axis.

In the viewing optical system of the image display apparatus according to the present invention, the optical system for the left eye and the optical system for the right eye are in 180-degree rotational symmetry with respect to only the normal line A-A' passing through the center of the image display device, as stated above. Therefore, in the following description of Examples 1 to 6, only the part of the viewing optical system for the right eye will be described, and "R" suffixed to reference symbols denoting constituent elements of the optical system for the right eye is omitted.

In numerical data (shown later) in each Example, data is shown with respect to the viewing optical system for the right eye as data obtained by backward ray tracing from a pupil 1 for the right eye to an image display device (image plane) 3. Regarding the viewing optical system for the left eye, numerical data is not shown for the reasons stated above. Numerical data concerning the viewing optical systems for the right and left eyes are in 180-degree rotational symmetry with each other with respect to the normal line A-A' passing through the center of the image display device. The following description of the arrangement will also be made in the order of backward ray tracing. Examples 1 to 6 will be described below with reference to the accompanying drawings.

EXAMPLE 1

Figures 2A, 2B:
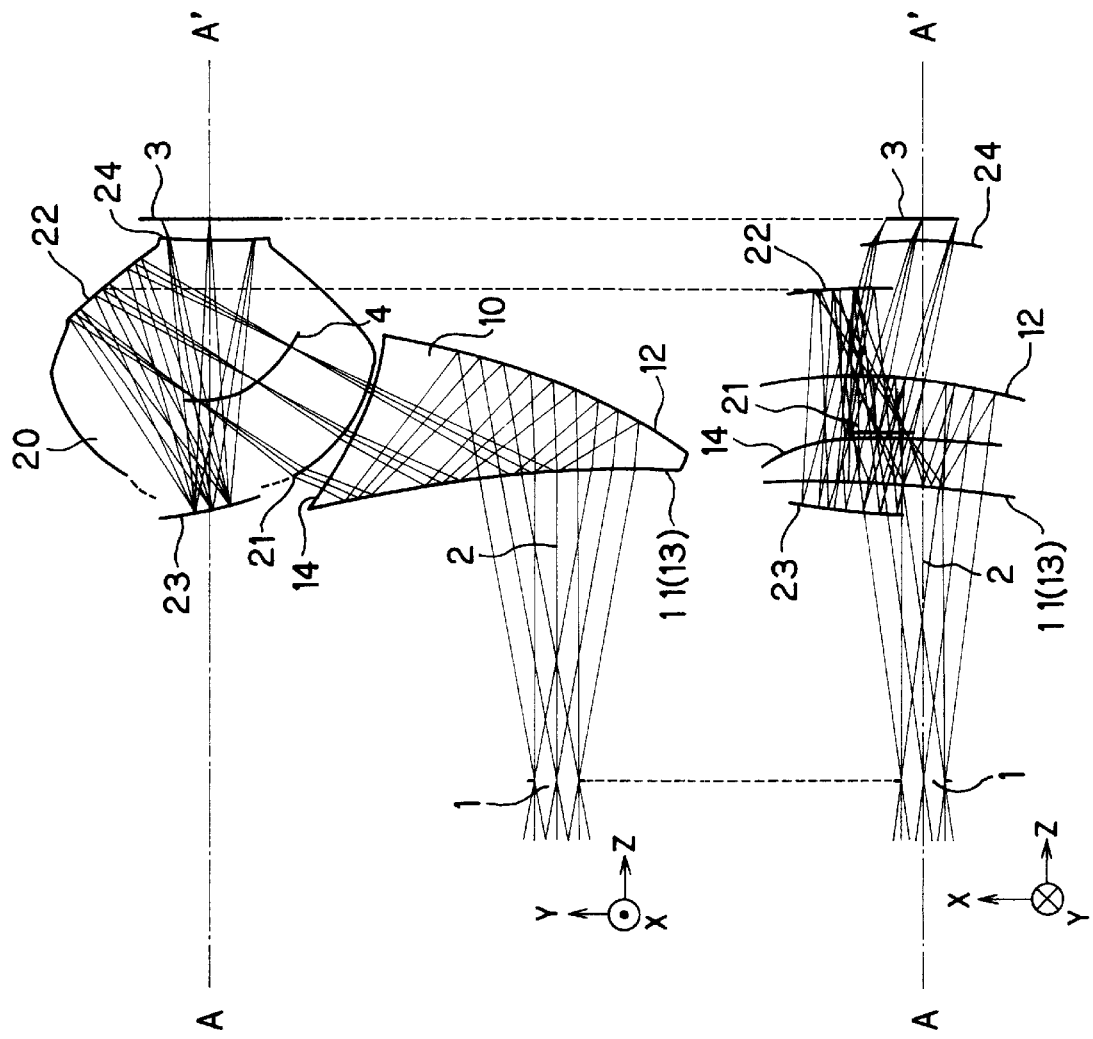
FIG. 2 is a diagram showing the right optical path (for the right eye) and optical surfaces of the viewing optical system in the image display apparatus according to Example 1 of the present invention, in which part (a) is a plan view, and part (b) is a side view.

FIG. 2 is a diagram showing the right optical path (for the right eye) and optical surfaces of the viewing optical system in the image display apparatus according to Example 1, in which part (a) is a plan view, and part (b) is a side view. The illustrated optical system is an optical system for the right eye when the image display apparatus is arranged as a head-mounted image display apparatus designed to be fitted for both eyes. An optical system for the left eye is constructed in 180-degree rotational symmetry with respect to the normal line A-A' passing through the center of the image display device 3.

In the viewing optical system according to this Example, the axial principal ray (optical axis) 2 in the backward ray tracing emerges from the pupil 1 where the pupil of the observer's right eye is to be positioned in a case where the image display apparatus is arranged as a head-mounted image display apparatus. The axial principal ray 2 enters the ocular prism 10 while being refracted through a first surface 11 of the ocular prism 10. The surface 11 also serves as a third surface 13 (totally reflecting surface). Then, the axial principal ray 2 is internally reflected by a second surface 12 and incident on the third surface 13 at an angle exceeding the critical angle. Consequently, the axial principal ray 2 is totally reflected by the third surface 13 and exits the ocular prism 10 while being refracted through a fourth surface 14. Then, the axial principal ray 2 enters the optical path distributing prism 20 while being refracted through a first surface 21. The axial principal ray 2 is internally reflected by a second surface 22 and further internally reflected by a third surface 23. Then, the axial principal ray 2 exits the optical path distributing prism 20 while being refracted through a fourth surface 24. Then, the axial principal ray 2 reaches the image display device 3.

The reflecting surface 12 of the ocular prism 10 is a free-form surface having no plane of symmetry. The totally reflecting surface 13 is an aspherical surface. The exit surface 14 is a free-form surface having no plane of symmetry. The entrance surface 21 and two reflecting surfaces 22 and 23 of the optical path distributing prism 20 are free-form surfaces having no plane of symmetry. The exit surface 24 of the optical path distributing prism 20 is a free-form surface having two planes of symmetry. The tilt angles of the principal rays (i.e. the incident angles of the principal rays) incident on the image display device 3 are within 30 degrees at all field angles.

In this Example, the ocular prism 10 is three-dimensionally decentered. Therefore, the axial principal ray 2 exiting the ocular prism 10 is present above (+X direction) the YZ-plane (i.e. a plane passing through the center of the pupil 1 and the normal line A-A'). Thereafter, the axial principal ray 2 enters the optical path distributing prism 20. The axial principal ray 2 is also three-dimensionally decentered at the first reflecting surface (in the backward ray tracing) 22 and the second reflecting surface (in the backward ray tracing) 23. Then, the axial principal ray 2 reaches the image display device 3. It should be noted that the optical path for the left eye is identical with the above-described optical path for the right eye as rotated through 180 degrees about the normal line A-A' passing through the center of the image display device 3 as an axis of rotation. Therefore, the axial principal ray exiting the ocular prism for the left eye is present below (−X direction) the YZ-plane. Thereafter, the axial principal ray enters the optical path distributing prism 20, in which it is reflected twice. Then, the axial principal ray reaches the image display device 3. Accordingly, when entering the optical path distributing prism 20, the optical paths (axial principal rays) for the left and right eyes are not in the same plane in the YZ-plane. The axial principal rays are vertically displaced from each other when entering the optical path distributing prism 20.

In this Example, an intermediate image 4 of the image display device 3 is formed in each of the left and right optical paths within the optical path distributing prism 20. The intermediate image 4 is observed through each of the left and right ocular prisms 10 as an enlarged image. When each of the left and right optical paths in the optical path distributing prism 20 is projected onto the YZ-plane, the optical path rotates within the optical path distributing prism 20 in such a manner that the optical path incident on the reflecting surface 22 and the optical path reflected from the reflecting surface 23 intersect each other.

With the above-described arrangement, this Example allows observation of the image of the single image display device 3 with both eyes. Accordingly, the costs can be reduced extremely. Further, because no half-mirror is used, a bright image can be observed. In addition, the left and right optical systems each have at least three reflecting surfaces, and the intermediate image (relay image) 4 is formed. Therefore, the required back focus can be ensured even when the viewing optical system is required to have a shortened focal length. Accordingly, it is possible to provide a high-performance viewing optical system compatible with a high-definition image display device 3.

Further, because free-form surfaces having no plane of symmetry are used in the ocular prisms 10 and the optical path distributing prism 20, complicated decentration aberrations due to the three-dimensionally decentered arrangement can be corrected favorably. Because the optical path distributing prism 20 is three-dimensionally decentered, the left and right final reflecting surfaces 23 of the optical path distributing prism 20, which are closest to the image display device 3 among the reflecting surfaces in the left and right optical paths, can be disposed adjacent to each other in the vertical direction of the observer (see FIG. 1). Accordingly, it becomes possible to minimize the principal ray tilt angle. In addition, the rotation of the image about the axial principal ray 2 due to the three-dimensionally decentered optical path can be minimized by using free-form surfaces having no plane of symmetry.

EXAMPLE 2

FIG. 3 is a diagram showing the right optical path (for the right eye) and optical surfaces of the viewing optical system in the image display apparatus according to Example 2, in which part (a) is a plan view, and part (b) is a side view. The illustrated optical system is an optical system for the right eye when the image display apparatus is arranged as a head-mounted image display apparatus designed to be fitted for both eyes. An optical system for the left eye is constructed in 180-degree rotational symmetry with respect to the normal line A-A' passing through the center of the image display device 3.

In the viewing optical system according to this Example, the axial principal ray (optical axis) 2 in the backward ray tracing emerges from the pupil 1 where the pupil of the observer's right eye is to be positioned in a case where the image display apparatus is arranged as a head-mounted image display apparatus. The axial principal ray 2 enters the ocular prism 10 while being refracted through a first surface 11 of the ocular prism 10. The surface 11 also serves as a third surface 13 (totally reflecting surface). Then, the axial principal ray 2 is internally reflected by a second surface 12 and incident on the third surface 13 at an angle exceeding the critical angle. Consequently, the axial principal ray 2 is totally reflected by the third surface 13 and exits the ocular prism 10 while being refracted through a fourth surface 14. Then, the axial principal ray 2 enters the optical path distributing prism 20 while being refracted through a first surface 21. The axial principal ray 2 is internally reflected by a second surface 22 and further internally reflected by a third surface 23. Then, the axial principal ray 2 exits the optical path distributing prism 20 while being refracted through a fourth surface 24. Then, the axial principal ray 2 reaches the image display device 3.

The reflecting surface 12 of the ocular prism 10 is a free-form surface having a plane of symmetry coincident with the YZ-plane. The totally reflecting surface 13 is an aspherical surface. The exit surface 14 is a free-form surface having a plane of symmetry coincident with the YZ-plane. The entrance surface 21 and two reflecting surfaces 22 and 23 of the optical path distributing prism 20 are free-form surfaces having no plane of symmetry. The exit surface 24 of the optical path distributing prism 20 is a free-form surface having two planes of symmetry. The tilt angles of the principal rays incident on the image display device 3 are within 15 degrees at all field angles.

In this Example, the ocular prism 10 is not three-dimensionally decentered as in Example 1 but used as a two-dimensionally decentered prism. Therefore, unlike in Example 1, the left and right axial principal rays 2 entering the optical path distributing prism 20 are present in the YZ-plane. Thereafter, the axial principal rays 2 are three-dimensionally decentered by the first reflecting surface 22 of the optical path distributing prism 20. The rotation of the image due to the three-dimensional decentration is corrected by rotating the image display device 3 about the observer's visual axis in such a manner as to cancel the image rotation.

In general, when the optical systems for the observer's left and right eyes are bilaterally symmetric optical systems, which are in symmetry with respect to a plane containing the middle between the left and right eyes, if the left and right optical paths are three-dimensionally decentered, the left and right images undesirably rotate in the opposite directions (i.e. the signs of rotation of the images about the visual axis are + and –, respectively). However, if the left and right optical systems are rotationally symmetric optical systems as in the present invention, the signs of rotation of the left and right images are the same. Accordingly, if the image display device 3 is disposed with an angle of rotation, it is possible to view the image of the single image display device 3 with both eyes.

In this Example, an intermediate image 4 of the image display device 3 is formed in each of the left and right optical paths within the optical path distributing prism 20. The intermediate image 4 is observed through each of the left and right ocular prisms 10 as an enlarged image. When each of the left and right optical paths in the optical path distributing prism 20 is projected onto the YZ-plane, the optical path rotates within the optical path distributing prism 20 in such a manner that the optical path incident on the reflecting surface 22 and the optical path reflected from the reflecting surface 23 intersect each other.

With the above-described arrangement, this Example allows observation of the image of the single image display device 3 with both eyes. Accordingly, the costs can be reduced extremely. Further, because no half-mirror is used, a bright image can be observed. In addition, the left and right optical systems each have at least three reflecting surfaces, and the intermediate image (relay image) 4 is formed. Therefore, the required back focus can be ensured even when the viewing optical system is required to have a shortened focal length. Accordingly, it is possible to provide a high-performance viewing optical system compatible with a high-definition image display device 3.

Further, because free-form surfaces having no plane of symmetry are used in the optical path distributing prism 20, complicated decentration aberrations due to the three-dimensionally decentered arrangement can be corrected favorably. In addition, the rotation of the image about the axial principal ray 2 due to the three-dimensionally decentered optical path can be corrected by rotating the image display device 3 in such a manner as to cancel the image rotation. Because the optical paths for the left and right eyes are in rotational symmetry, the rotation of the images occurs in the same direction. Accordingly, it is possible to observe the image of a single image display device with both eyes.

Because the ocular prism 10 is horizontally two-dimensionally decentered, positioning of the left and right prisms (10L and 10R) is facilitated. Accordingly, it becomes easy to assemble the prism optical system. Because the principal ray tilt angle is restricted within 15 degrees, even an image display device whose viewing angle is not very wide can be used to provide an optical system allowing observation of the image of a single image display device with both eyes.

EXAMPLE 3

FIG. 4 is a diagram showing the right optical path (for the right eye) and optical surfaces of the viewing optical system in the image display apparatus according to Example 3, in which part (a) is a plan view, and part (b) is a side view. The illustrated optical system is an optical system for the right eye when the image display apparatus is arranged as a head-mounted image display apparatus designed to be fitted for both eyes. An optical system for the left eye is constructed in 180-degree rotational symmetry with respect to the normal line A-A' passing through the center of the image display device 3.

The arrangement of this Example is the same as that of Example 1 except that the tilt angles of the principal rays incident on the image display device 3 are within 15 degrees at all field angles.

With the foregoing arrangement, this Example allows observation of the image of the single image display device 3 with both eyes. Accordingly, the costs can be reduced extremely. Further, because no half-mirror is used, a bright image can be observed. In addition, the left and right optical systems each have at least three reflecting surfaces, and the intermediate image (relay image) 4 is formed. Therefore, the required back focus can be ensured even when the viewing optical system is required to have a shortened focal length. Accordingly, it is possible to provide a high-performance viewing optical system compatible with a high-definition image display device 3.

Further, because free-form surfaces having no plane of symmetry are used in the ocular prisms 10 and the optical path distributing prism 20, complicated decentration aberrations due to the three-dimensionally decentered arrangement can be corrected favorably. In addition, the rotation of the image about the axial principal ray 2 due to the three-dimensionally decentered optical path can be corrected by rotating the image display device 3 in such a manner as to cancel the image rotation. Because the optical paths for the left and right eyes are in rotational symmetry, the rotation of the images occurs in the same direction. Accordingly, it is possible to observe the image of a single image display device with both eyes. Because the principal ray tilt angle is restricted within 15 degrees, even an image display device whose viewing angle is not very wide can be used to provide an optical system allowing observation of the image a single image display device with both eyes.

EXAMPLE 4

FIG. 5 is a diagram showing the right optical path (for the right eye) and optical surfaces of the viewing optical system in the image display apparatus according to Example 4, in which part (a) is a plan view, and part (b) is a side view. The illustrated optical system is an optical system for the right eye when the image display apparatus is arranged as a head-mounted image display apparatus designed to be fitted for both eyes. An optical system for the left eye is constructed in 180-degree rotational symmetry with respect to the normal line A-A' passing through the center of the image display device 3.

This Example has an arrangement similar to that of Example 1. In this Example, the ocular prism 10 and the optical path distributing prism 20 are integrated into a single prism 30. As the result of integrating together the ocular prism 10 and the optical path distributing prism 20, the fourth surface 14 of the ocular prism 10 and the first surface 21 of the optical path distributing prism 20 disappear.

In the viewing optical system according to this Example, the axial principal ray (optical axis) 2 in the backward ray tracing emerges from the pupil 1 where the pupil of the observer's right eye is to be positioned in a case where the image display apparatus is arranged as a head-mounted image display apparatus. The axial principal ray 2 enters the integrated prism 30 while being refracted through a first surface 11 of the ocular prism part 10. The surface 11 also serves as a third surface 13 (totally reflecting surface). Then, the axial principal ray 2 is internally reflected by a second surface 12 and incident on the third surface 13 at an angle exceeding the critical angle. Consequently, the axial principal ray 2 is totally reflected by the third surface 13. Then, the axial principal ray 2 is internally reflected by a surface 22 of the optical path distributing prism part 20 and further internally reflected by a surface 23. Then, the axial principal ray 2 exits the prism 30 while being refracted through a surface 24. Then, the axial principal ray 2 reaches the image display device 3.

The reflecting surfaces 12, 22 and 23 are free-form surfaces having no plane of symmetry. The totally reflecting surface 13 is an aspherical surface. The exit surface 24 is a free-form surface having two planes of symmetry. The tilt angles of the principal rays (i.e. the incident angles of the principal rays) incident on the image display device 3 are within 25 degrees at all field angles.

With the above-described arrangement, this Example allows observation of the image of the single image display device 3 with both eyes. Accordingly, the costs can be reduced extremely. Further, because no half-mirror is used, a bright image can be observed. In addition, the left and right optical systems each have at least three reflecting surfaces, and the intermediate image (relay image) 4 is formed. Therefore, the required back focus can be ensured even when the viewing optical system is required to have a shortened focal length. Accordingly, it is possible to provide a high-performance viewing optical system compatible with a high-definition image display device 3.

Further, because free-form surfaces having no plane of symmetry are used in the integrated prism 30, complicated decentration aberrations due to the three-dimensionally decentered arrangement can be corrected favorably. In addition, the rotation of the image about the axial principal ray 2 due to the three-dimensionally decentered optical path can be corrected by rotating the image display device 3 in such a manner as to cancel the image rotation. Because the optical paths for the left and right eyes are in rotational symmetry, the rotation of the images occurs in the same direction. Accordingly, it is possible to observe the image of a single image display device with both eyes.

When the left and right ocular prisms and the optical path distributing member are formed from respective prisms, it is very difficult to align the optical axes of the three members. Moreover, because an intermediate image is formed once in the optical system, the power of each surface is strong, and the assembly accuracy becomes very strict. In this Example, the left and right ocular prisms and the optical path distributing member are integrated into a single prism 30. Accordingly, an image display apparatus allowing observation of the image of a single image display device with both eyes can be constructed of only a single prism 30. Thus, it becomes unnecessary to perform assembly adjustment. Accordingly, it becomes possible to produce the image display apparatus at further reduced costs.

EXAMPLE 5

Figures 6A, 6B:
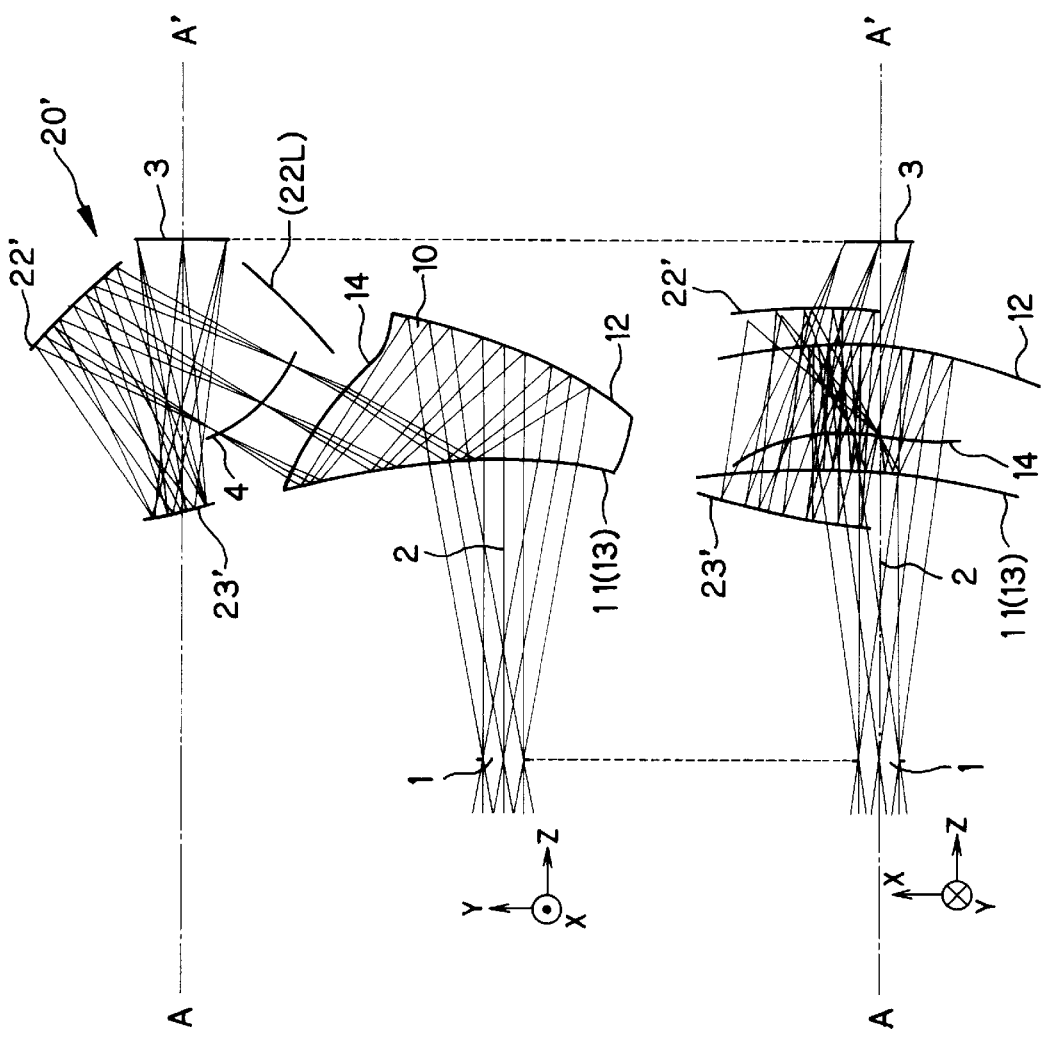
FIG. 6 is a diagram showing the right optical path (for the right eye) and optical surfaces of the viewing optical system in the image display apparatus according to Example 5 of the present invention, in which part (a) is a plan view, and part (b) is a side view.

FIG. 6 is a diagram showing the right optical path (for the right eye) and optical surfaces of the viewing optical system in the image display apparatus according to Example 5, in which part (a) is a plan view, and part (b) is a side view. The illustrated optical system is an optical system for the right eye when the image display apparatus is arranged as a head-mounted image display apparatus designed to be fitted for both eyes. An optical system for the left eye is constructed in 180-degree rotational symmetry with respect to the normal line A-A' passing through the center of the image display device 3.

This Example has an arrangement similar to that of Example 1. In this Example, the optical path distributing prism 20 is replaced with an optical path distributing mirror member 20' having reflecting mirrors 22' and 23' corresponding to the reflecting surfaces 22 and 23 of the optical path distributing prism 20. Both the ocular prism 10 and the optical path distributing mirror member 20' are three-dimensionally decentered.

In the viewing optical system according to this Example, the axial principal ray (optical axis) 2 in the backward ray tracing emerges from the pupil 1 where the pupil of the observer's right eye is to be positioned in a case where the image display apparatus is arranged as a head-mounted image display apparatus. The axial principal ray 2 enters the ocular prism 10 while being refracted through a first surface 11 of the ocular prism 10. The surface 11 also serves as a third surface 13 (totally reflecting surface). Then, the axial principal ray 2 is internally reflected by a second surface 12 and incident on the third surface 13 at an angle exceeding the critical angle. Consequently, the axial principal ray 2 is totally reflected by the third surface 13 and exits the ocular prism 10 while being refracted through a fourth surface 14. Then, the axial principal ray 2 is reflected by the first reflecting surface 22' of the optical path distributing mirror member 20' and further reflected by the second reflecting surface 23' to reach the image display device 3.

The reflecting surface 12 of the ocular prism 10 is a free-form surface having no plane of symmetry. The totally reflecting surface 13 is an aspherical surface. The exit surface 14 is a free-form surface having no plane of symmetry. The two reflecting surfaces 22' and 23' of the optical path distributing mirror member 20' are free-form surfaces having no plane of symmetry. The tilt angles of the principal rays (i.e. the incident angles of the principal rays) incident on the image display device 3 are within 25 degrees at all field angles.

With the above-described arrangement, this Example allows observation of the image of the single image display device 3 with both eyes. Accordingly, the costs can be reduced extremely. Further, because no half-mirror is used, a bright image can be observed. In addition, the left and right optical systems each have at least three reflecting surfaces, and the intermediate image (relay image) 4 is formed. Therefore, the required back focus can be ensured even when the viewing optical system is required to have a shortened focal length. Accordingly, it is possible to provide a high-performance viewing optical system compatible with a high-definition image display device 3.

Further, because free-form surfaces having no plane of symmetry are used in the ocular prisms 10 and the optical path distributing mirror member 20', complicated decentration aberrations due to the three-dimensionally decentered arrangement can be corrected favorably. In addition, the rotation of the image about the axial principal ray 2 due to the three-dimensionally decentered optical path can be corrected by rotating the image display device 3 in such a manner as to cancel the image rotation. Because the optical paths for the left and right eyes are in rotational symmetry, the rotation of the images occurs in the same direction. Accordingly, it is possible to observe the image of a single image display device with both eyes.

Further, because the principal ray tilt angle is restricted within 25 degrees, even an image display device whose viewing angle is not very wide can be used to provide an optical system allowing observation of the image of a single image display device with both eyes.

Because the optical path distributing member is not a prism but a mirror member, a very lightweight image display apparatus can be provided.

EXAMPLE 6

Figures 7A, 7B:
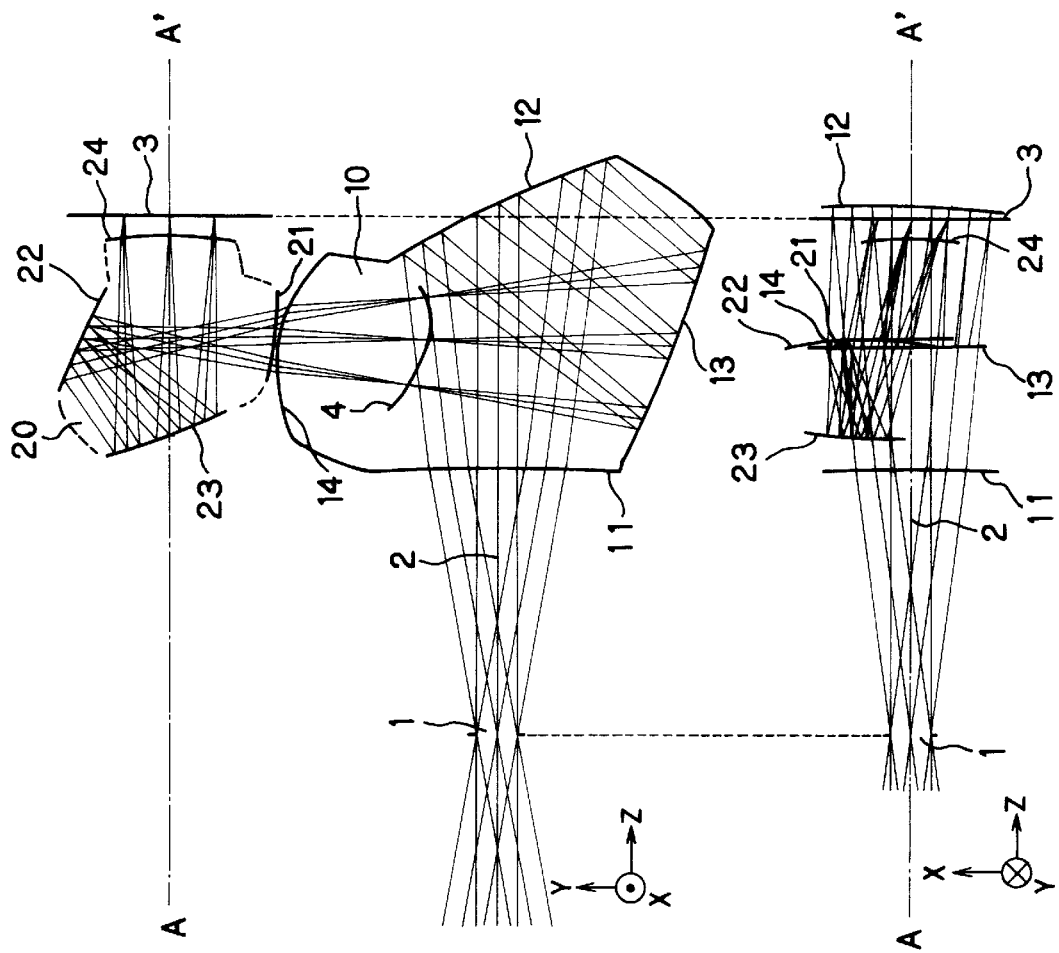
FIG. 7 is a diagram showing the right optical path (for the right eye) and optical surfaces of the viewing optical system in the image display apparatus according to Example 6 of the present invention, in which part (a) is a plan view, and part (b) is a side view.

FIG. 7 is a diagram showing the right optical path (for the right eye) and optical surfaces of the viewing optical system in the image display apparatus according to Example 6, in which part (a) is a plan view, and part (b) is a side view. The illustrated optical system is an optical system for the right eye when the image display apparatus is arranged as a head-mounted image display apparatus designed to be fitted for both eyes. An optical system for the left eye is constructed in 180-degree rotational symmetry with respect to the normal line A-A' passing through the center of the image display device 3.

In the viewing optical system according to this Example, the axial principal ray (optical axis) 2 in the backward ray tracing emerges from the pupil 1 where the pupil of the observer's right eye is to be positioned in a case where the image display apparatus is arranged as a head-mounted image display apparatus. The axial principal ray 2 enters the ocular prism 10 while being refracted through a first surface 11 of the ocular prism 10. Then, the axial principal ray 2 is internally reflected by a second surface 12 and further internally reflected by a third surface 13. The reflected axial principal ray 2 exits the ocular prism 10 while being refracted through a fourth surface 14. Then, the axial principal ray 2 enters the optical path distributing prism 20 while being refracted through a first surface 21. The axial principal ray 2 is internally reflected by a second surface 22 and further internally reflected by a third surface 23. Then, the axial principal ray 2 exits the optical path distributing prism 20 while being refracted through a fourth surface 24. Then, the axial principal ray 2 reaches the image display device 3.

The first surface 11 of the ocular prism 10 is an aspherical surface. The second, third and fourth surfaces 12, 13 and 14 of the ocular prism 10 are free-form surfaces having no plane of symmetry. The entrance surface 21 and two reflecting surfaces 22 and 23 of the optical path distributing prism 20 are free-form surfaces having no plane of symmetry. The exit surface 24 of the optical path distributing prism 20 is a free-form surface having two planes of symmetry. The tilt angles of the principal rays incident on the image display device 3 are within 25 degrees at all field angles.

In this Example, the ocular prism 10 has three-dimensionally decentered optical path. Therefore, the axial principal ray 2 exiting the ocular prism 10 is present above (+X direction) the YZ-plane. Thereafter, the axial principal ray 2 enters the optical path distributing prism 20. The axial principal ray 2 is also three-dimensionally decentered at the first reflecting surface 22 and the second reflecting surface 23. Then, the axial principal ray 2 reaches the image display device 3. It should be noted that the optical path for the left eye is identical with the above-described optical path for the right eye as rotated through 180 degrees about the normal line A-A' passing through the center of the image display device 3 as an axis of rotation. Therefore, the axial principal ray exiting the ocular prism for the left eye is present below (-X direction) the YZ-plane. Accordingly, the first reflecting surface 22R of the optical path for the right eye in the optical path distributing prism 20 and the entrance surface 21L of the optical path for the left eye in the optical path distributing prism 20 are disposed to separate from each other approximately in the vertical direction. Accordingly, the left and right surfaces do not interfere with each other.

In this Example, when the optical path in the ocular prism 10 is projected onto the YZ-plane, the optical path rotates within the ocular prism 10 in such a manner as to intersect itself in the same way as the rotation of the optical path within the optical path distributing prism 20. However, the direction of rotation of the optical path in the ocular prism 10 is opposite to that in the optical path distributing prism 20. The intermediate image 4 in each of the left and right optical paths is formed within the ocular prism 10. The intermediate image 4 is observed through each of the left and right ocular prisms 10 as an enlarged image.

With the above-described arrangement, this Example allows observation of the image of the single image display device 3 with both eyes. Accordingly, the costs can be reduced extremely. Further, because no half-mirror is used, a bright image can be observed. In addition, the left and right optical systems each have at least three reflecting surfaces, and the intermediate image (relay image) 4 is formed. Therefore, the required back focus can be ensured even when the viewing optical system is required to have a shortened focal length. Accordingly, it is possible to provide a high-performance viewing optical system compatible with a high-definition image display device 3.

Further, because free-form surfaces having no plane of symmetry are used in the ocular prisms 10 and the optical path distributing prism 20, complicated decentration aberrations due to the three-dimensionally decentered arrangement can be corrected favorably. In addition, the rotation of the image about the axial principal ray 2 due to the three-dimensionally decentered optical path can be corrected by rotating the image display device 3 in such a manner as to cancel the image rotation. Because the optical paths for the left and right eyes are in rotational symmetry, the rotation of the images occurs in the same direction. Accordingly, it is possible to observe the image of a single image display device with both eyes.

Further, because the principal ray tilt angle is restricted within 25 degrees, even an image display device whose viewing angle is not very wide can be used to provide an optical system allowing observation of the image of a single image display device with both eyes.

If a strong power is given to the totally reflecting surface 13 of the ocular prism 10 as in Examples 1 to 4, decentration aberrations occur in very large amounts. With the arrangement of this Example, because no totally reflecting surface is used, the required power can be distributed uniformly to the reflecting surfaces. Accordingly, favorable performance can be attained.

Incidentally, as shown in FIGS. 1 to 7, a left-handed coordinate system is defined for Examples 1 to 6. That is, the center of the exit pupil 1 of the optical system for the right eye, at which the observer's right eye is to be positioned is defined as the origin of the coordinate system. The horizontal direction of the observer is defined as a Y-axis. The vertical direction of the observer is defined as an X-axis. Further, the direction of the observer's visual axis is defined as a Z-axis. With respect to the left-handed coordinate system, it is desirable that the axial principal ray 2 of each of the left and right optical paths should satisfy the following conditions at the final reflecting surface 23 or 23' (the first reflecting surface in the forward ray tracing) of the optical path distributing prism 20 or the optical path distributing mirror member 20'.

$$20.0 > |X(L), X(R)| > 1.0 \text{ (mm)} \quad (2)$$

$$|X(L) - X(R)| > 2.0 \text{ (mm)} \quad (3)$$

where X(L) and X(R) are the coordinate values in the X-direction of points at which the left and right axial principal rays are incident on the left and right first reflecting surfaces 23 or 23', respectively, which are positioned closest to the image display device 3.

The conditions (2) and (3) need to be satisfied in order to minimize the principal ray tilt angle with respect to the image display device 3. If |X(L), X(R)| is not smaller than the upper limit of the condition (1), i.e. 20 millimeters, image rotation and decentration aberrations due to the three-dimensionally decentered arrangement occur to a considerable extent. Consequently, it becomes difficult to ensure favorable performance. At the same time, the apparatus becomes unfavorably large in size. If |X(L), X(R)| is not larger than the lower limit, i.e. 1.0 millimeter, it becomes impossible to ensure the effective diameters in the vertical direction of the optical paths for the left and right eyes. Accordingly, it is necessary to arrange the left and right optical paths so that the principal rays are incident on the image display device 3 from the longitudinal direction (horizontal direction of the image display area) of the image display device 3. Consequently, the principal ray tilt angle becomes unfavorably large.

If |X(L)−X(R)| is not larger than the lower limit of the condition (3), i.e. 2.0 millimeters, it becomes impossible to ensure the effective diameters of the optical paths for the left and right eyes in the vertical direction.

Accordingly, if the above-described conditions (2) and (3) are satisfied, it is possible to provide a very compact image display apparatus while favorably correcting complicated decentration aberrations despite the three-dimensionally decentered arrangement. At the same time, it is possible to minimize the principal ray tilt angle.

Regarding the condition (2), it is preferable to satisfy the following condition (2-1):

$$15.0 > |X(L), X(R)| > 2.0 \text{ (mm)} \quad (2-1)$$

If the condition (2-1) is satisfied, it is possible to minimize the principal ray tilt angle with respect to the image display device 3 even more favorably.

Figures 1A, 1B:
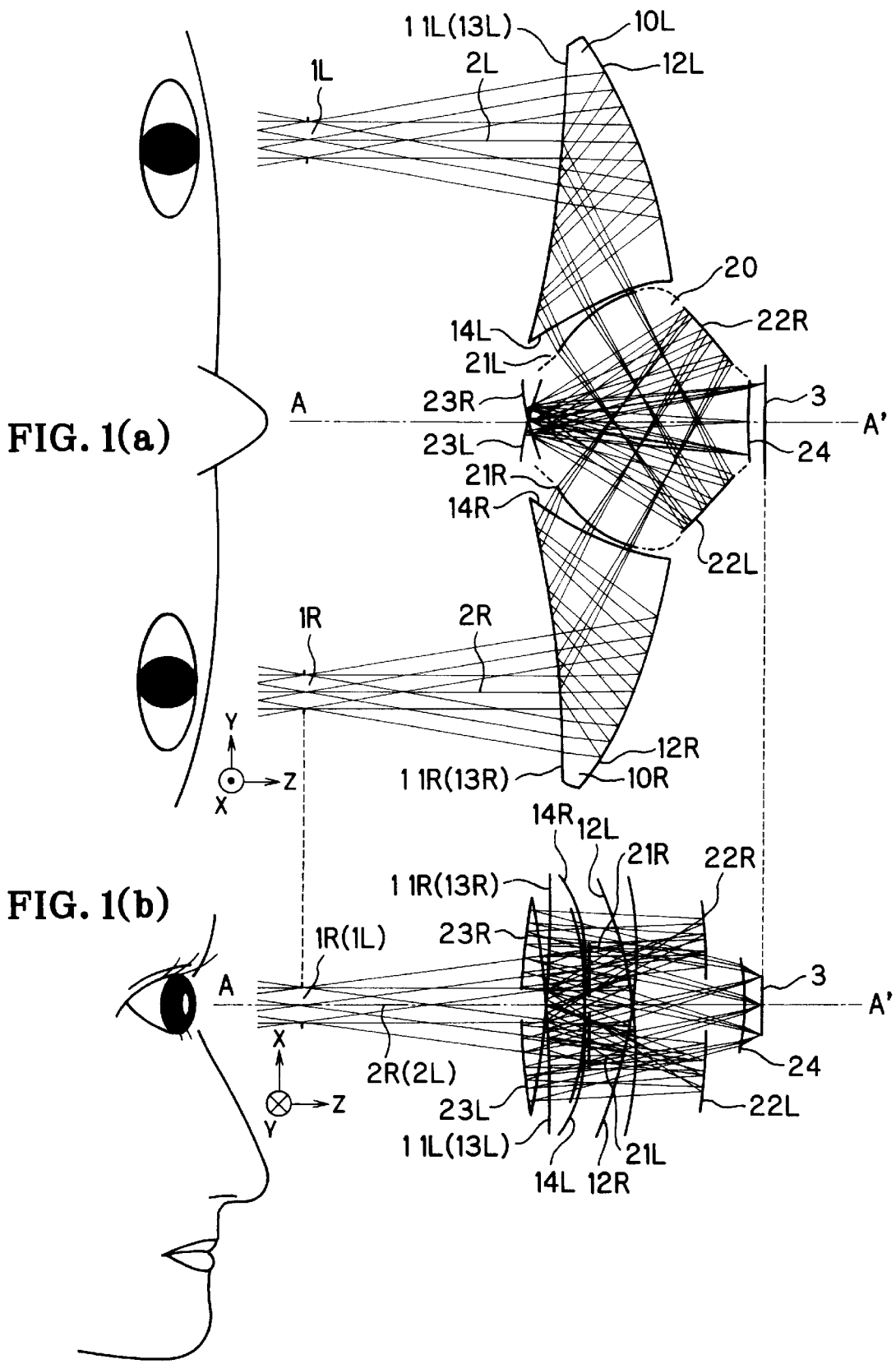
FIG. 1 is a diagram showing left and right optical paths (for left and right eyes) and optical surfaces of a viewing optical system in an image display apparatus according to Example 1 of the present invention, in which part (a) is a plan view, and part (b) is a side view.

Next, constituent parameters in the above-described Examples 1 to 6 will be shown. In the constituent parameters in each Example, as shown in FIG. 1 by way of example, the axial principal ray 2 is defined by a light ray passing perpendicularly through the center of the exit pupil 1 of the optical system and reaching the center of the image display device 3 in the backward ray tracing. Further, in the backward ray tracing, the center of the pupil 1 is defined as the origin of each decentered optical surface constituting a decentered optical system. The direction along which the axial principal ray 2 travels until it intersects the first surface 11 of the ocular prism 10 is defined as a Z-axis. The direction in which the Z-axis extends from the pupil 1 toward the first surface 11 is defined as a positive direction of the Z-axis. A plane containing the axial principal ray 2 passing through the center of the exit pupil and also containing the center of the image display device 3 is defined as a YZ-plane. An axis passing through the origin and perpendicularly intersecting the YZ-plane is defined as an X-axis. The direction in which the X-axis extends upward in the vertical direction is defined as a positive direction of the X-axis. An axis that constitutes a left-handed orthogonal coordinate system in combination with the X- and Z-axes is defined as a Y-axis.

Regarding decentered surfaces, each surface is given displacements in the X-, Y- and Z-axis directions (X, Y and Z, respectively) of the vertex position of the surface from the origin of the optical system, and tilt angles (degrees) of the center axis of the surface [the Z-axis of the above equation (a) in regard to free-form surfaces; the Z-axis of the following equation (d) in the case of aspherical surfaces] with respect to the X-, Y- and Z-axes ($\alpha$, $\beta$ and $\gamma$, respectively). In this case, the positive $\alpha$ and $\beta$ mean counterclockwise rotation relative to the positive directions of the corresponding axes, and the positive $\gamma$ means clockwise rotation relative to the positive direction of the Z-axis. It should be noted that the way of rotating the center axis of each surface through $\alpha$, $\beta$ and $\gamma$ is as follows. First, the center axis of the surface and the XYZ orthogonal coordinate system are rotated through $\alpha$ counterclockwise about the X-axis. Then, the rotated center axis of the surface is rotated through $\beta$ counterclockwise about the Y-axis of the new coordinate system, and the coordinate system once rotated is also rotated through $\beta$ counterclockwise about the Y-axis. Then, the center axis of the surface, which has been rotated twice, is rotated through $\gamma$ clockwise about the Z-axis of the new coordinate system.

Among optical functional surfaces constituting the optical system in each Example, a specific surface and a surface subsequent thereto are given a surface separation when these surfaces form a coaxial optical system. In addition, the refractive index and Abbe's number of each medium are given according to the conventional method.

The configuration of each free-form surface used in the present invention is defined by the above equation (a). The Z-axis of the defining equation is the axis of the free-form surface.

Aspherical surfaces used in the present invention are rotationally symmetric aspherical surfaces given by the following equation:

$$z=(y^2/R)/[1+\{1-(1+K)y^2/R^2\}^{1/2}]+Ay^4+By^6+Cy^8+Dy^{10}+\ldots \quad (d)$$

In the above equation, Z is an optical axis (axial principal ray) for which the direction of travel of light is defined as a positive direction, and y is taken in a direction perpendicular to the optical axis. R is a paraxial curvature radius, and K is a conic constant. A, B, C, D . . . are 4th-, 6th-, 8th- and 10th-order aspherical coefficients, respectively. The Z-axis of this defining equation is the axis of the rotationally symmetric aspherical surface.

In the constituent parameters (shown later), those terms concerning free-form surfaces and aspherical surfaces for which no data is shown are zero. The refractive index is expressed by the refractive index for the spectral d-line (wavelength: 587.56 nanometers). Lengths are given in millimeters.

It should be noted that when Examples 1 to 6 are arranged in the form of a viewing optical system, the viewing field angles are as follows. The horizontal half field angle is 10.0°, and the vertical half field angle is 7.5°. The size of the image display device 3 is 8.94×6.716 millimeters. The pupil diameter is 4 millimeters.

It should be noted that in the tables showing constituent parameters below, "FFS" denotes a free-form surface, and "ASS" denotes an aspherical surface, and further "RE" denotes a reflecting surface.

EXAMPLE 1

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Pupil) | | | | |
| 2 | ASS① | | (1) | 1.5254 | 56.2 |
| 3 | FFS① (RE) | | (2) | 1.5254 | 56.2 |
| 4 | ASS① (RE) | | (1) | 1.5254 | 56.2 |
| 5 | FFS② | | (3) | | |
| 6 | FFS③ | | (4) | 1.5254 | 56.2 |
| 7 | FFS④ (RE) | | (5) | 1.5254 | 56.2 |
| 8 | FFS⑤ (RE) | | (6) | 1.5254 | 56.2 |
| 9 | FFS⑥ | | (7) | | |
| Image plane | ∞ | | (8) | | |

ASS①

R     −128.64
K       0.0000
A       $1.1462 \times 10^{-7}$
B       $7.4184 \times 10^{-10}$

FFS①

| | | | | | |
|---|---|---|---|---|---|
| $C_4$ | $-1.1090 \times 10^{-2}$ | $C_5$ | $-2.2385 \times 10^{-4}$ | $C_6$ | $-8.3821 \times 10^{-3}$ |
| $C_7$ | $-2.8053 \times 10^{-6}$ | $C_8$ | $-1.6666 \times 10^{-5}$ | $C_9$ | $2.1554 \times 10^{-5}$ |
| $C_{10}$ | $3.7462 \times 10^{-5}$ | $C_{11}$ | $-1.6098 \times 10^{-6}$ | $C_{12}$ | $8.2354 \times 10^{-7}$ |
| $C_{13}$ | $-3.2713 \times 10^{-6}$ | $C_{14}$ | $3.0613 \times 10^{-7}$ | $C_{15}$ | $-1.3349 \times 10^{-6}$ |

FFS②

| | | | | | |
|---|---|---|---|---|---|
| $C_4$ | $-1.6824 \times 10^{-2}$ | $C_5$ | $8.2505 \times 10^{-3}$ | $C_6$ | $8.9961 \times 10^{-3}$ |
| $C_7$ | $-1.9848 \times 10^{-3}$ | $C_8$ | $6.2149 \times 10^{-3}$ | $C_9$ | $-1.4487 \times 10^{-3}$ |
| $C_{10}$ | $-2.6704 \times 10^{-4}$ | $C_{11}$ | $-1.2960 \times 10^{-4}$ | $C_{13}$ | $-4.2211 \times 10^{-5}$ |
| $C_{15}$ | $5.1351 \times 10^{-5}$ | | | | |

FFS③

| | | | | | |
|---|---|---|---|---|---|
| $C_4$ | $-1.4429 \times 10^{-2}$ | $C_5$ | $1.2722 \times 10^{-2}$ | $C_6$ | $-3.5076 \times 10^{-2}$ |
| $C_7$ | $5.4225 \times 10^{-5}$ | $C_8$ | $2.3627 \times 10^{-3}$ | $C_9$ | $7.1269 \times 10^{-4}$ |
| $C_{10}$ | $-2.5316 \times 10^{-4}$ | $C_{11}$ | $1.9386 \times 10^{-5}$ | $C_{12}$ | $-4.2900 \times 10^{-4}$ |
| $C_{13}$ | $-3.6272 \times 10^{-5}$ | $C_{14}$ | $7.0885 \times 10^{-5}$ | $C_{15}$ | $-1.5365 \times 10^{-5}$ |

FFS④

| | | | | | |
|---|---|---|---|---|---|
| $C_4$ | $1.2456 \times 10^{-2}$ | $C_5$ | $7.5990 \times 10^{-4}$ | $C_6$ | $5.8004 \times 10^{-3}$ |
| $C_7$ | $-4.2779 \times 10^{-5}$ | $C_8$ | $9.6240 \times 10^{-5}$ | $C_9$ | $-4.7988 \times 10^{-5}$ |
| $C_{10}$ | $2.0937 \times 10^{-5}$ | $C_{11}$ | $3.0010 \times 10^{-6}$ | $C_{12}$ | $3.4936 \times 10^{-6}$ |
| $C_{13}$ | $-3.5617 \times 10^{-6}$ | $C_{14}$ | $1.8955 \times 10^{-6}$ | $C_{15}$ | $-6.2442 \times 10^{-6}$ |

FFS⑤

| | | | | | |
|---|---|---|---|---|---|
| $C_4$ | $-5.9034 \times 10^{-3}$ | $C_5$ | $-6.6316 \times 10^{-4}$ | $C_6$ | $-1.3385 \times 10^{-2}$ |
| $C_7$ | $3.4980 \times 10^{-5}$ | $C_8$ | $1.2327 \times 10^{-5}$ | $C_9$ | $7.3066 \times 10^{-5}$ |
| $C_{10}$ | $-1.1256 \times 10^{-4}$ | $C_{11}$ | $7.8849 \times 10^{-6}$ | $C_{12}$ | $5.2324 \times 10^{-6}$ |
| $C_{13}$ | $6.9946 \times 10^{-6}$ | $C_{14}$ | $1.9048 \times 10^{-6}$ | $C_{15}$ | $2.1763 \times 10^{-7}$ |

FFS⑥

| | | | | | |
|---|---|---|---|---|---|
| $C_4$ | $-2.1061 \times 10^{-2}$ | $C_6$ | $1.3211 \times 10^{-2}$ | $C_{11}$ | $1.1432 \times 10^{-4}$ |
| $C_{13}$ | $-2.8535 \times 10^{-4}$ | $C_{15}$ | $-2.1251 \times 10^{-4}$ | | |

Displacement and tilt(1)

| X | 2.62 | Y | 10.53 | Z | 28.01 |
|---|---|---|---|---|---|
| α | 8.60 | β | 3.59 | γ | 0.00 |

Displacement and tilt(2)

| X | −0.26 | Y | 0.21 | Z | 37.93 |
|---|---|---|---|---|---|
| α | −22.14 | β | 7.10 | γ | 0.00 |

Displacement and tilt(3)

| X | 3.80 | Y | 18.86 | Z | 32.37 |
|---|---|---|---|---|---|
| α | 63.45 | β | 0.80 | γ | 0.00 |

Displacement and tilt(4)

| X | 3.97 | Y | 19.59 | Z | 32.76 |
|---|---|---|---|---|---|
| α | −127.57 | β | 1.39 | γ | 0.00 |

Displacement and tilt(5)

| X | 7.62 | Y | 41.90 | Z | 46.44 |
|---|---|---|---|---|---|
| α | −138.17 | β | 4.87 | γ | 0.00 |

Displacement and tilt(6)

| X | 7.06 | Y | 32.00 | Z | 25.51 |
|---|---|---|---|---|---|
| α | −167.15 | β | −6.34 | γ | 0.00 |

Displacement and tilt(7)

| X | 0.00 | Y | 32.00 | Z | 51.01 |
|---|---|---|---|---|---|
| α | 0.00 | β | 0.00 | γ | 0.00 |

Displacement and tilt(8)

| X | 0.00 | Y | 32.00 | Z | 52.95 |
|---|---|---|---|---|---|
| α | 0.00 | β | 0.00 | γ | 0.00 |

EXAMPLE 2

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Pupil) | | | | |
| 2 | ASS① | | (1) | 1.5254 | 56.2 |
| 3 | FFS① (RE) | | (2) | 1.5254 | 56.2 |
| 4 | ASS① (RE) | | (1) | 1.5254 | 56.2 |
| 5 | FFS② | | (3) | | |
| 6 | FFS③ | | (4) | 1.5254 | 56.2 |
| 7 | FFS④ (RE) | | (5) | 1.5254 | 56.2 |
| 8 | FFS⑤ (RE) | | (6) | 1.5254 | 56.2 |
| 9 | FFS⑥ | | (7) | | |
| Image plane | ∞ | | (8) | | |

ASS①

R     −91.98
K       0.0000
A       $1.6394 \times 10^{-6}$
B       $-5.0435 \times 10^{-10}$ -continued

FFS①

| | | | | | |
|---|---|---|---|---|---|
| $C_4$ | $-1.1799 \times 10^{-2}$ | $C_6$ | $-9.0172 \times 10^{-3}$ | $C_8$ | $-4.2003 \times 10^{-5}$ |
| $C_{10}$ | $4.9733 \times 10^{-5}$ | $C_{11}$ | $-2.6399 \times 10^{-6}$ | $C_{13}$ | $-1.8834 \times 10^{-6}$ |
| $C_{15}$ | $-1.2673 \times 10^{-6}$ | | | | |

FFS②

| | | | | | |
|---|---|---|---|---|---|
| $C_4$ | $-2.9416 \times 10^{-2}$ | $C_6$ | $3.0567 \times 10^{-2}$ | $C_8$ | $9.9155 \times 10^{-3}$ |
| $C_{10}$ | $-6.0479 \times 10^{-4}$ | $C_{11}$ | $4.0820 \times 10^{-3}$ | $C_{13}$ | $2.5936 \times 10^{-4}$ |
| $C_{15}$ | $-3.3739 \times 10^{-5}$ | | | | |

FFS③

| | | | | | |
|---|---|---|---|---|---|
| $C_4$ | $5.5720 \times 10^{-2}$ | $C_5$ | $-3.1204 \times 10^{-3}$ | $C_6$ | $-5.9563 \times 10^{-2}$ |
| $C_7$ | $-1.4157 \times 10^{-3}$ | $C_8$ | $2.9007 \times 10^{-3}$ | $C_9$ | $-2.0264 \times 10^{-4}$ |
| $C_{10}$ | $-3.7301 \times 10^{-4}$ | $C_{11}$ | $-4.2124 \times 10^{-3}$ | $C_{12}$ | $5.1676 \times 10^{-4}$ |
| $C_{13}$ | $5.7216 \times 10^{-5}$ | $C_{14}$ | $-7.4604 \times 10^{-5}$ | $C_{15}$ | $2.4324 \times 10^{-5}$ |

FFS④

| | | | | | |
|---|---|---|---|---|---|
| $C_4$ | $1.1679 \times 10^{-2}$ | $C_5$ | $3.3066 \times 10^{-4}$ | $C_6$ | $3.8132 \times 10^{-3}$ |
| $C_7$ | $-7.4535 \times 10^{-6}$ | $C_8$ | $1.7129 \times 10^{-4}$ | $C_9$ | $-1.7733 \times 10^{-5}$ |
| $C_{10}$ | $-5.4938 \times 10^{-5}$ | $C_{11}$ | $5.0996 \times 10^{-6}$ | $C_{12}$ | $-3.4515 \times 10^{-6}$ |
| $C_{13}$ | $-1.0725 \times 10^{-8}$ | $C_{14}$ | $4.6795 \times 10^{-7}$ | $C_{15}$ | $-9.2060 \times 10^{-8}$ |

FFS⑤

| | | | | | |
|---|---|---|---|---|---|
| $C_4$ | $-7.1389 \times 10^{-3}$ | $C_5$ | $-1.0958 \times 10^{-3}$ | $C_8$ | $-1.4247 \times 10^{-2}$ |
| $C_7$ | $3.7565 \times 10^{-5}$ | $C_8$ | $7.8216 \times 10^{-5}$ | $C_9$ | $-3.0617 \times 10^{-5}$ |
| $C_{10}$ | $-1.0438 \times 10^{-4}$ | $C_{11}$ | $1.3010 \times 10^{-5}$ | $C_{12}$ | $-6.4426 \times 10^{-6}$ |
| $C_{13}$ | $-3.3164 \times 10^{-8}$ | $C_{14}$ | $2.7308 \times 10^{-7}$ | $C_{15}$ | $-8.3683 \times 10^{-7}$ |

FFS⑥

| | | | | | |
|---|---|---|---|---|---|
| $C_4$ | $-4.9260 \times 10^{-2}$ | $C_8$ | $-1.7011 \times 10^{-2}$ | $C_{11}$ | $4.5500 \times 10^{-4}$ |
| $C_{13}$ | $3.2155 \times 10^{-4}$ | $C_{15}$ | $-5.6317 \times 10^{-4}$ | | |

Displacement and tilt(1)

| X | 0.00 | Y | 8.67 | Z | 28.00 |
|---|---|---|---|---|---|
| α | 11.27 | β | 0.00 | γ | 0.00 |

Displacement and tilt(2)

| X | 0.00 | Y | 0.30 | Z | 37.54 |
|---|---|---|---|---|---|
| α | −19.59 | β | 0.00 | γ | 0.00 |

Displacement and tilt(3)

| X | 0.00 | Y | 17.95 | Z | 32.57 |
|---|---|---|---|---|---|
| α | 66.44 | β | 0.00 | γ | 0.00 |

Displacement and tilt(4)

| X | 0.00 | Y | 18.67 | Z | 32.94 |
|---|---|---|---|---|---|
| α | −119.29 | β | 0.00 | γ | 0.00 |

Displacement and tilt(5)

| X | 0.00 | Y | 42.37 | Z | 45.64 |
|---|---|---|---|---|---|
| α | −135.88 | β | −4.54 | γ | 0.00 |

Displacement and tilt(6)

| X | 3.57 | Y | 32.00 | Z | 24.58 |
|---|---|---|---|---|---|
| α | −166.93 | β | −7.84 | γ | 0.00 |

Displacement and tilt(7)

| X | 0.00 | Y | 32.00 | Z | 51.94 |
|---|---|---|---|---|---|
| α | 0.00 | β | 0.00 | γ | 0.00 |

Displacement and tilt(8)

| X | 0.00 | Y | 32.00 | Z | 53.89 |
|---|---|---|---|---|---|
| α | 0.00 | β | 0.00 | γ | 6.75 |

EXAMPLE 3

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Pupil) | | | | |
| 2 | ASS① | | (1) | 1.5254 | 56.2 |
| 3 | FFS① (RE) | | (2) | 1.5254 | 56.2 |
| 4 | ASS① (RE) | | (1) | 1.5254 | 56.2 |
| 5 | FFS② | | (3) | | |
| 6 | FFS③ | | (4) | 1.5254 | 56.2 |
| 7 | FFS④ (RE) | | (5) | 1.5254 | 56.2 |
| 8 | FFS⑤ (RE) | | (6) | 1.5254 | 56.2 |
| 9 | FFS⑥ | | (7) | | |
| Image plane | ∞ | | (8) | | |

ASS①

| R | −58.97 |
|---|---|
| K | 0.0000 |
| A | $5.2572 \times 10^{-6}$ |
| B | $-1.9962 \times 10^{-9}$ |

FFS①

| | | | | | |
|---|---|---|---|---|---|
| $C_4$ | $-1.0795 \times 10^{-2}$ | $C_5$ | $-1.9793 \times 10^{-4}$ | $C_6$ | $-1.1386 \times 10^{-2}$ |
| $C_7$ | $-9.8893 \times 10^{-8}$ | $C_8$ | $2.0792 \times 10^{-5}$ | $C_9$ | $2.2740 \times 10^{-6}$ |
| $C_{10}$ | $6.9947 \times 10^{-5}$ | $C_{11}$ | $1.6225 \times 10^{-6}$ | $C_{12}$ | $9.1673 \times 10^{-7}$ |
| $C_{13}$ | $6.5751 \times 10^{-7}$ | $C_{14}$ | $4.3831 \times 10^{-7}$ | $C_{15}$ | $-1.2319 \times 10^{-5}$ |

FFS②

| | | | | | |
|---|---|---|---|---|---|
| $C_4$ | $9.2430 \times 10^{-3}$ | $C_5$ | $8.6207 \times 10^{-3}$ | $C_6$ | $2.5468 \times 10^{-2}$ |
| $C_7$ | $-1.6903 \times 10^{-3}$ | $C_8$ | $-1.1955 \times 10^{-3}$ | $C_9$ | $-1.3318 \times 10^{-3}$ |
| $C_{10}$ | $-4.0702 \times 10^{-4}$ | $C_{11}$ | $1.7377 \times 10^{-4}$ | $C_{13}$ | $2.6667 \times 10^{-4}$ |
| $C_{15}$ | $-4.8305 \times 10^{-5}$ | | | | |

FFS③

| | | | | | |
|---|---|---|---|---|---|
| $C_4$ | $-1.0646 \times 10^{-2}$ | $C_5$ | $1.0203 \times 10^{-2}$ | $C_6$ | $-6.2493 \times 10^{-2}$ |
| $C_7$ | $9.7944 \times 10^{-4}$ | $C_8$ | $-1.8740 \times 10^{-3}$ | $C_9$ | $9.3002 \times 10^{-4}$ |
| $C_{10}$ | $-7.5543 \times 10^{-5}$ | $C_{11}$ | $-2.7259 \times 10^{-4}$ | $C_{12}$ | $5.4393 \times 10^{-5}$ |
| $C_{13}$ | $-2.2931 \times 10^{-4}$ | $C_{14}$ | $1.9495 \times 10^{-5}$ | $C_{15}$ | $7.5278 \times 10^{-5}$ |

FFS④

| | | | | | |
|---|---|---|---|---|---|
| $C_4$ | $8.9222 \times 10^{-3}$ | $C_5$ | $2.0223 \times 10^{-4}$ | $C_6$ | $7.2938 \times 10^{-3}$ |
| $C_7$ | $-8.8906 \times 10^{-5}$ | $C_8$ | $-1.0370 \times 10^{-5}$ | $C_9$ | $-3.5575 \times 10^{-5}$ |
| $C_{10}$ | $-6.4679 \times 10^{-6}$ | $C_{11}$ | $-1.3894 \times 10^{-5}$ | $C_{12}$ | $-2.9463 \times 10^{-6}$ |
| $C_{13}$ | $-8.6154 \times 10^{-6}$ | $C_{14}$ | $7.7833 \times 10^{-7}$ | $C_{15}$ | $-6.3945 \times 10^{-6}$ |

FFS⑤

| | | | | | |
|---|---|---|---|---|---|
| $C_4$ | $-1.2726 \times 10^{-2}$ | $C_5$ | $-7.0428 \times 10^{-4}$ | $C_5$ | $-1.1654 \times 10^{-2}$ |
| $C_7$ | $5.8167 \times 10^{-6}$ | $C_8$ | $-2.0360 \times 10^{-4}$ | $C_9$ | $1.8004 \times 10^{-5}$ |
| $C_{10}$ | $-2.1400 \times 10^{-4}$ | $C_{11}$ | $-5.0573 \times 10^{-6}$ | $C_{12}$ | $4.3890 \times 10^{-6}$ |
| $C_{13}$ | $-4.1900 \times 10^{-6}$ | $C_{14}$ | $3.5462 \times 10^{-6}$ | $C_{15}$ | $-5.1992 \times 10^{-8}$ |

FFS⑥

| | | | | | |
|---|---|---|---|---|---|
| $C_4$ | $-5.3381 \times 10^{-2}$ | $C_5$ | $-3.2665 \times 10^{-2}$ | $C_{11}$ | $-2.2857 \times 10^{-5}$ |
| $C_{13}$ | $3.7762 \times 10^{-5}$ | $C_{15}$ | $-3.3237 \times 10^{-5}$ | | |

Displacement and tilt(1)

| X | 0.91 | Y | 8.31 | Z | 28.00 |
|---|---|---|---|---|---|
| α | 13.35 | β | 1.20 | γ | 0.00 |

Displacement and tilt(2)

| X | −0.10 | Y | 0.28 | Z | 37.21 |
|---|---|---|---|---|---|
| α | −19.51 | β | 2.89 | γ | 0.00 |

Displacement and tilt(3)

| X | 1.48 | Y | 17.59 | Z | 31.81 |
|---|---|---|---|---|---|
| α | 73.36 | β | −3.17 | γ | 0.00 |

Displacement and tilt(4)

| X | 1.51 | Y | 18.05 | Z | 32.02 |
|---|---|---|---|---|---|
| α | −116.54 | β | 0.28 | γ | 0.00 |

Displacement and tilt(5)

| X | 2.61 | Y | 42.81 | Z | 43.97 |
|---|---|---|---|---|---|
| α | −134.82 | β | −1.30 | γ | 0.00 |

Displacement and tilt(6)

| X | 4.65 | Y | 32.00 | Z | 21.86 |
|---|---|---|---|---|---|
| α | −166.92 | β | −6.86 | γ | 0.00 |

-continued

| | | | | | | | |
|---|---|---|---|---|---|---|---|
| | | | Displacement and tilt(7) | | | | |
| X | 0.00 | Y | 32.00 | Z | 49.10 | | |
| α | 0.00 | β | 0.00 | γ | 0.00 | | |
| | | | Displacement and tilt(8) | | | | |
| X | 0.00 | Y | 32.00 | Z | 51.02 | | |
| α | 0.00 | β | 0.00 | γ | 3.63 | | |

EXAMPLE 4

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Pupil) | | | | |
| 2 | ASS① | | (1) | 1.5254 | 56.2 |
| 3 | FFS① (RE) | | (2) | 1.5254 | 56.2 |
| 4 | ASS① (RE) | | (1) | 1.5254 | 56.2 |
| 5 | FFS② | | (3) | 1.5254 | 56.2 |
| 6 | FFS③ | | (4) | 1.5254 | 56.2 |
| 7 | FFS④ (RE) | | (5) | 1.5254 | 56.2 |
| 8 | FFS⑤ (RE) | | (6) | 1.5254 | 56.2 |
| 9 | FFS⑥ | | (7) | | |
| Image plane | ∞ | | (8) | | |

ASS①

R −500.17
K 0.0000
A 9.3084 × 10$^{-8}$
B 1.3474 × 10$^{-10}$

FFS①

| $C_4$ | −1.3536 × 10$^{-2}$ | $C_5$ | 4.6245 × 10$^{-4}$ | $C_6$ | −6.9775 × 10$^{-3}$ |
| $C_7$ | −8.1273 × 10$^{-6}$ | $C_8$ | −4.7814 × 10$^{-5}$ | $C_9$ | 4.6444 × 10$^{-6}$ |
| $C_{10}$ | 3.1046 × 10$^{-6}$ | $C_{11}$ | −7.1780 × 10$^{-7}$ | $C_{12}$ | 3.2765 × 10$^{-7}$ |
| $C_{13}$ | −4.3489 × 10$^{-6}$ | $C_{14}$ | 3.8364 × 10$^{-7}$ | $C_{15}$ | −9.2727 × 10$^{-7}$ |

FFS②

| $C_4$ | 1.4969 × 10$^{-2}$ | $C_5$ | 1.2737 × 10$^{-3}$ | $C_6$ | 4.6242 × 10$^{-3}$ |
| $C_7$ | −1.2361 × 10$^{-5}$ | $C_8$ | −9.2734 × 10$^{-5}$ | $C_9$ | −8.8410 × 10$^{-5}$ |
| $C_{10}$ | −1.1997 × 10$^{-4}$ | $C_{11}$ | 2.3360 × 10$^{-6}$ | $C_{12}$ | −5.4093 × 10$^{-7}$ |
| $C_{13}$ | 1.4143 × 10$^{-6}$ | $C_{14}$ | −2.4653 × 10$^{-7}$ | $C_{16}$ | −1.3866 × 10$^{-6}$ |

FFS③

| $C_4$ | 1.7065 × 10$^{-4}$ | $C_5$ | 3.1088 × 10$^{-4}$ | $C_6$ | −1.4618 × 10$^{-2}$ |
| $C_7$ | 3.3778 × 10$^{-6}$ | $C_6$ | −1.2578 × 10$^{-4}$ | $C_9$ | −3.0329 × 10$^{-5}$ |
| $C_{10}$ | −1.3247 × 10$^{-4}$ | $C_{11}$ | 4.9175 × 10$^{-7}$ | $C_{12}$ | 7.3701 × 10$^{-7}$ |
| $C_{13}$ | 1.3224 × 10$^{-5}$ | $C_{14}$ | 1.8453 × 10$^{-6}$ | $C_{15}$ | 1.5465 × 10$^{-6}$ |

FFS④

| $C_4$ | −4.8208 × 10$^{-3}$ | $C_6$ | −3.8445 × 10$^{-2}$ | $C_{11}$ | −1.8202 × 10$^{-4}$ |
| $C_{13}$ | 1.2546 × 10$^{-3}$ | $C_{15}$ | 1.3986 × 10$^{-3}$ | | |

Displacement and tilt(1)

| X | 1.92 | Y | 12.51 | Z | 29.98 |
| α | 7.01 | β | 2.86 | γ | 0.00 |

Displacement and tilt(2)

| X | −0.16 | Y | 0.30 | Z | 40.12 |
| α | −24.06 | β | 4.75 | γ | 0.00 |

Displacement and tilt(3)

| X | 4.35 | Y | 41.23 | Z | 44.10 |
| α | −133.93 | β | 0.85 | γ | 0.00 |

Displacement and tilt(4)

| X | 5.28 | Y | 32.00 | Z | 27.00 |
| α | −165.71 | β | 6.84 | γ | 0.00 |

Displacement and tilt(5)

| X | 0.00 | Y | 32.00 | Z | 50.52 |

-continued

| | | | | | |
|---|---|---|---|---|---|
| α | 0.00 | β | 0.00 | γ | 0.00 |
| | | Displacement and tilt(6) | | | |
| X | 0.00 | Y | 32.00 | Z | 53.60 |
| α | 0.00 | β | 0.00 | γ | 2.39 |

EXAMPLE 5

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Pupil) | | | | |
| 2 | ASS① | | (1) | 1.5254 | 56.2 |
| 3 | FFS① (RE) | | (2) | 1.5254 | 56.2 |
| 4 | ASS① (RE) | | (1) | 1.5254 | 56.2 |
| 5 | FFS②(RE) | | (3) | | |
| 6 | FFS③(RE) | | (4) | | |
| 7 | FFS④ | | (5) | | |
| Image plane | ∞ | | (6) | | |

ASS①

R −96.38
K 0.0000
A −5.3714 × 10$^{-6}$
B 4.3672 × 10$^{-9}$

FFS①

| $C_4$ | −1.0699 × 10$^{-2}$ | $C_5$ | −6.9849 × 10$^{-4}$ | $C_6$ | −9.1913 × 10$^{-8}$ |
| $C_7$ | −1.5577 × 10$^{-5}$ | $C_8$ | 7.4221 × 10$^{-6}$ | $C_9$ | 5.8654 × 10$^{-6}$ |
| $C_{10}$ | 4.6856 × 10$^{-5}$ | $C_{11}$ | −2.6070 × 10$^{-6}$ | $C_{12}$ | 1.3182 × 10$^{-6}$ |
| $C_{13}$ | −3.5893 × 10$^{-6}$ | $C_{14}$ | 2.8073 × 10$^{-7}$ | $C_{15}$ | −1.6931 × 10$^{-6}$ |

FFS②

| $C_4$ | −3.6042 × 10$^{-2}$ | $C_5$ | 5.9122 × 10$^{-3}$ | $C_6$ | 2.1452 × 10$^{-2}$ |
| $C_7$ | −2.8054 × 10$^{-3}$ | $C_8$ | 2.9833 × 10$^{-3}$ | $C_9$ | −3.7494 × 10$^{-4}$ |
| $C_{10}$ | −9.4668 × 10$^{-5}$ | $C_{11}$ | 3.7883 × 10$^{-5}$ | $C_{13}$ | 3.0239 × 10$^{-4}$ |
| $C_{15}$ | 7.6455 × 10$^{-5}$ | | | | |

FFS③

| $C_4$ | 1.1832 × 10$^{-2}$ | $C_5$ | −1.2480 × 10$^{-4}$ | $C_6$ | 6.4461 × 10$^{-3}$ |
| $C_7$ | −2.9627 × 10$^{-5}$ | $C_8$ | 2.8652 × 10$^{-5}$ | $C_9$ | −1.4685 × 10$^{-5}$ |
| $C_{10}$ | −1.4671 × 10$^{-5}$ | $C_{11}$ | 2.7288 × 10$^{-6}$ | $C_{12}$ | 3.5052 × 10$^{-7}$ |
| $C_{13}$ | 2.6858 × 10$^{-6}$ | $C_{14}$ | 1.3185 × 10$^{-6}$ | $C_{15}$ | 2.2095 × 10$^{-6}$ |

FFS④

| $C_4$ | −6.9392 × 10$^{-3}$ | $C_5$ | −2.5128 × 10$^{-3}$ | $C_6$ | −1.1683 × 10$^{-2}$ |
| $C_7$ | 2.3092 × 10$^{-5}$ | $C_8$ | −5.4142 × 10$^{-5}$ | $C_9$ | 2.6577 × 10$^{-5}$ |
| $C_{10}$ | −1.0301 × 10$^{-4}$ | $C_{11}$ | 5.1818 × 10$^{-6}$ | $C_{12}$ | −1.8005 × 10$^{-7}$ |
| $C_{13}$ | 3.4973 × 10$^{-6}$ | $C_{14}$ | 5.6748 × 10$^{-7}$ | $C_{15}$ | 1.3415 × 10$^{-6}$ |

Displacement and tilt(1)

| X | 2.06 | Y | 11.87 | Z | 29.23 |
| α | 8.95 | β | 3.11 | γ | 0.00 |

Displacement and tilt(2)

| X | −0.33 | Y | 0.01 | Z | 41.85 |
| α | −21.49 | β | 5.07 | γ | 0.00 |

Displacement and tilt(3)

| X | 2.61 | Y | 18.77 | Z | 33.12 |
| α | 57.33 | β | 6.81 | γ | 0.00 |

Displacement and tilt(4)

| X | 7.29 | Y | 42.77 | Z | 45.66 |
| α | −135.25 | β | 2.42 | γ | 0.00 |

Displacement and tilt(5)

| X | 9.42 | Y | 32.00 | Z | 24.81 |
| α | −165.98 | β | −12.41 | γ | 0.00 |

-continued

| Displacement and tilt(6) | | | | | |
|---|---|---|---|---|---|
| X | 0.00 | Y | 32.00 | Z | 52.27 |
| α | 0.00 | β | 0.00 | γ | 5.24 |

EXAMPLE 6

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Pupil) | | | | |
| 2 | ASS① | | (1) | 1.5254 | 56.2 |
| 3 | FFS① (RE) | | (2) | 1.5254 | 56.2 |
| 4 | ASS② (RE) | | (3) | 1.5254 | 56.2 |
| 5 | FFS③ | | (4) | | |
| 6 | FFS④ | | (5) | 1.5254 | 56.2 |
| 7 | FFS⑤ (RE) | | (6) | 1.5254 | 56.2 |
| 8 | FFS⑥ (RE) | | (7) | 1.5254 | 56.2 |
| 9 | FFS⑦ | | (8) | | |
| Image plane | ∞ | | (9) | | |

ASS①

R   −261.65
K   0.0000
A   −1.8999 × $10^{-6}$
B   3.7428 × $10^{-9}$

FFS①

| $C_4$ | −4.8078 × $10^{-3}$ | $C_5$ | 5.7575 × $10^{-4}$ | $C_6$ | −3.8492 × $10^{-3}$ |
| $C_7$ | −3.9011 × $10^{-6}$ | $C_8$ | 5.0522 × $10^{-6}$ | $C_9$ | −5.5023 × $10^{-6}$ |
| $C_{10}$ | 3.0947 × $10^{-6}$ | $C_{11}$ | 2.2960 × $10^{-7}$ | $C_{12}$ | −3.1287 × $10^{-7}$ |
| $C_{13}$ | −9.6169 × $10^{-7}$ | $C_{14}$ | −2.5213 × $10^{-7}$ | $C_{15}$ | 2.2958 × $10^{-8}$ |

FFS②

| $C_4$ | 2.6486 × $10^{-3}$ | $C_5$ | 5.9099 × $10^{-4}$ | $C_6$ | 3.7158 × $10^{-3}$ |
| $C_7$ | −1.4597 × $10^{-6}$ | $C_8$ | −1.2779 × $10^{-6}$ | $C_9$ | −2.6459 × $10^{-6}$ |
| $C_{10}$ | 5.6302 × $10^{-6}$ | $C_{11}$ | −1.6173 × $10^{-7}$ | $C_{12}$ | −1.0154 × $10^{-6}$ |
| $C_{13}$ | −2.5726 × $10^{-7}$ | $C_{14}$ | −8.8710 × $10^{-7}$ | $C_{15}$ | −3.3907 × $10^{-7}$ |

FFS③

| $C_4$ | −2.0759 × $10^{-2}$ | $C_5$ | −8.7557 × $10^{-3}$ | $C_6$ | −3.3552 × $10^{-2}$ |
| $C_7$ | −1.9280 × $10^{-3}$ | $C_8$ | −6.2951 × $10^{-4}$ | $C_9$ | 1.2750 × $10^{-4}$ |
| $C_{10}$ | 2.0286 × $10^{-6}$ | $C_{11}$ | −1.0821 × $10^{-4}$ | $C_{13}$ | 5.5674 × $10^{-6}$ |
| $C_{15}$ | −4.3620 × $10^{-5}$ | | | | |

FFS④

| $C_4$ | −1.4520 × $10^{-2}$ | $C_5$ | −1.7299 × $10^{-3}$ | $C_6$ | −7.4708 × $10^{-3}$ |
| $C_7$ | 2.4272 × $10^{-3}$ | $C_8$ | −2.7781 × $10^{-4}$ | $C_9$ | 2.2320 × $10^{-4}$ |
| $C_{10}$ | 4.1693 × $10^{-4}$ | $C_{11}$ | 1.6456 × $10^{-4}$ | $C_{12}$ | −7.6067 × $10^{-7}$ |
| $C_{13}$ | 1.0654 × $10^{-4}$ | $C_{14}$ | −2.8222 × $10^{-5}$ | $C_{15}$ | 2.9840 × $10^{-5}$ |

FFS⑤

| $C_4$ | 6.7525 × $10^{-3}$ | $C_5$ | 7.2420 × $10^{-4}$ | $C_6$ | 7.4663 × $10^{-3}$ |
| $C_7$ | 2.9322 × $10^{-6}$ | $C_8$ | 8.3218 × $10^{-5}$ | $C_9$ | 5.5845 × $10^{-6}$ |
| $C_{10}$ | 1.6595 × $10^{-5}$ | $C_{11}$ | −1.4606 × $10^{-5}$ | $C_{12}$ | 4.4918 × $10^{-6}$ |
| $C_{13}$ | −1.7796 × $10^{-6}$ | $C_{14}$ | −7.2505 × $10^{-7}$ | $C_{15}$ | −1.5270 × $10^{-6}$ |

FFS⑥

| $C_4$ | −1.1971 × $10^{-2}$ | $C_5$ | −2.2065 × $10^{-4}$ | $C_6$ | −7.2646 × $10^{-3}$ |
| $C_7$ | 1.6728 × $10^{-5}$ | $C_8$ | −5.3221 × $10^{-5}$ | $C_9$ | 9.0805 × $10^{-5}$ |
| $C_{10}$ | −1.1665 × $10^{-4}$ | $C_{11}$ | −9.6189 × $10^{-6}$ | $C_{12}$ | −5.7833 × $10^{-6}$ |
| $C_{13}$ | 5.1459 × $10^{-6}$ | $C_{14}$ | 6.8423 × $10^{-7}$ | $C_{15}$ | −2.2176 × $10^{-6}$ |

FFS⑦

| $C_4$ | −1.7334 × $10^{-2}$ | $C_6$ | −1.3492 × $10^{-2}$ |

Displacement and tilt(1)

| X | 0.00 | Y | 0.00 | Z | 26.40 |
| α | 0.00 | β | 0.00 | γ | 0.00 |

Displacement and tilt(2)

| X | 0.00 | Y | 0.00 | Z | 52.41 |
| α | 25.36 | β | 1.93 | γ | 0.00 |

Displacement and tilt(3)

| X | 1.33 | Y | −16.97 | Z | 38.55 |
| α | 69.77 | β | −0.81 | γ | 0.00 |

Displacement and tilt(4)

| X | 4.67 | Y | 21.07 | Z | 39.34 |
| α | 79.10 | β | −11.47 | γ | 0.00 |

Displacement and tilt(5)

| X | 4.68 | Y | 21.56 | Z | 39.31 |
| α | −96.72 | β | 18.16 | γ | 0.00 |

Displacement and tilt(6)

| X | 7.12 | Y | 40.45 | Z | 39.20 |
| α | −114.22 | β | 8.07 | γ | 0.00 |

Displacement and tilt(7)

| X | 5.47 | Y | 32.00 | Z | 29.57 |
| α | −159.16 | β | 3.29 | γ | 0.00 |

Displacement and tilt(8)

| X | 0.00 | Y | 32.00 | Z | 49.32 |
| α | 0.00 | β | 0.00 | γ | 0.00 |

Displacement and tilt(9)

| X | 0.00 | Y | 32.00 | Z | 51.16 |
| α | 0.00 | β | 0.00 | γ | −4.66 |

Figure 8:
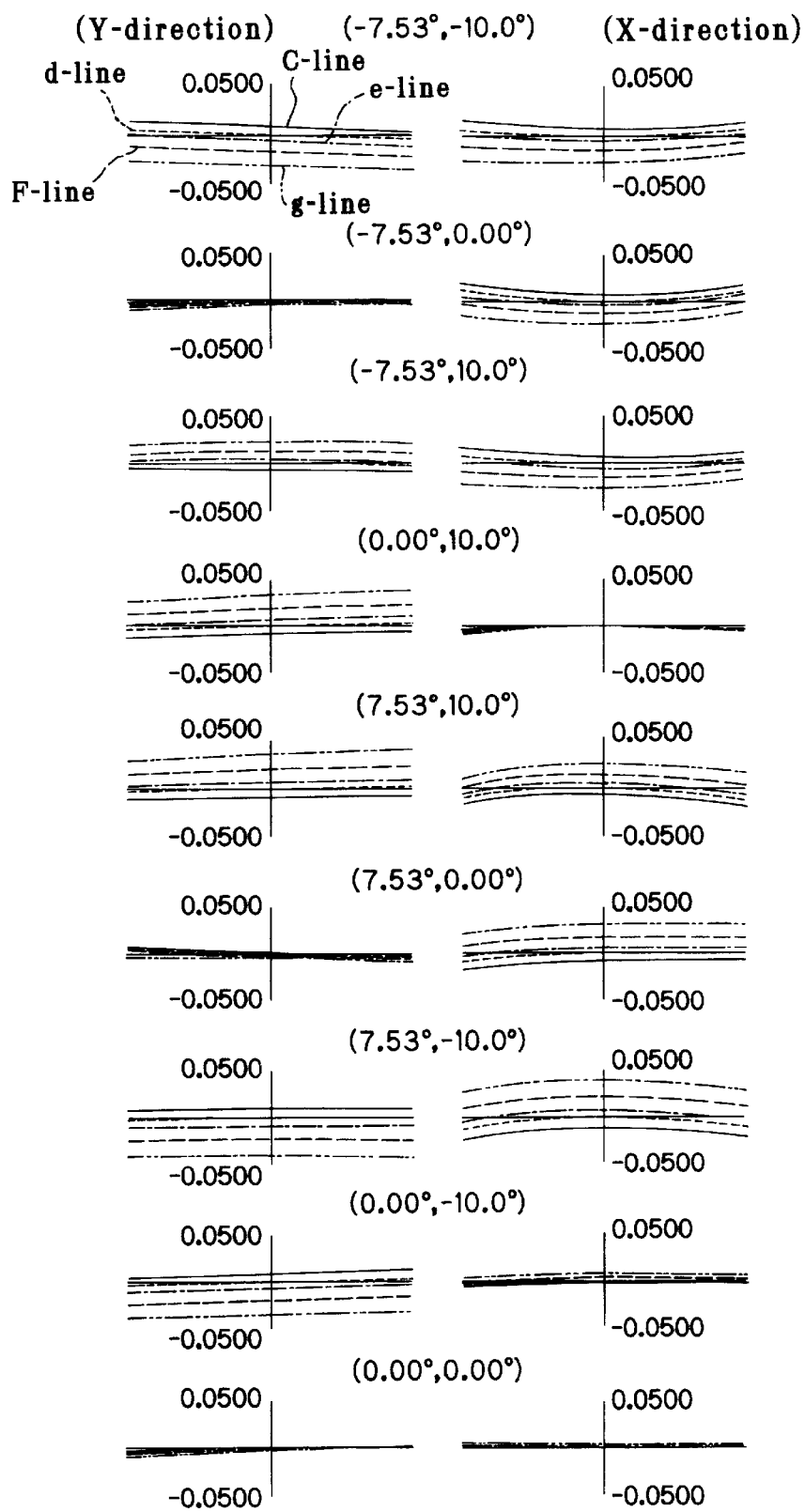
FIG. 8 is an aberrational diagram showing lateral aberrations in the viewing optical system of the image display apparatus according to Example 1.

FIG. 8 is an aberrational diagram showing lateral aberrations in the above-described Example 1. In the diagram showing lateral aberrations, the numerals in the parentheses denote (horizontal (X direction) field angle, vertical (Y direction) field angle), and lateral aberrations at the field angles are shown.

The values concerning the conditions (1) to (3) in the above-described Examples 1 to 6 are as follows:

| Examples | 1 | 2 | 3 | 4 | 5 | 6 |
|---|---|---|---|---|---|---|
| (1) | 44.9 | 22.7 | 30.0 | 33.0 | 37.9 | 43.5 |
| (2) | 7.06 | 3.57 | 4.65 | 5.28 | 9.42 | 5.47 |
| (3) | 14.11 | 7.14 | 9.30 | 10.57 | 18.85 | 10.95 |

It should be noted that any of the viewing optical systems for observing the image of a single image display device with two eyes that are shown in Japanese Patent Application Nos. 2000-48750 and 2000-93233 can be arranged on the basis of the present invention so that the left and right optical paths of the viewing optical system for the left and right eyes are not in plane symmetry with each other but in 180-degree rotational symmetry with respect to only a normal line passing through the center of the image display device. An image display apparatus having three-dimensionally decentered optical path, which uses such a viewing optical system, is also included in the present invention.

In the image display apparatus according to the present invention, a display light beam emitted from a single image display device 3 at a somewhat divergent exit angle is made incident on the entrance surface 24 of the optical path distributing prism 20 (Examples 1 to 4 and 6) or on the entrance surface 23' of the optical path distributing mirror member 20' (Example 5) while being split into the left and right optical paths so that the display light beam can be observed with two eyes through the left and right ocular prisms. An image display device such as that shown in part (a) of FIG. 9 may be used as the image display device 3 common to the left and right optical paths. The image display device 3 shown in part (a) of FIG. 9 comprises a liquid crystal display device 31 that is illuminated uniformly with a white backlight 32 and that emits a display light beam at an exit angle larger than the angle θ formed between the optical axes of the left and right optical paths. As the image display device 3, it is also possible to use an autoluminescence type display device having a large exit angle of display light, such as an electroluminescent (EL) display device.

Figure 9A:
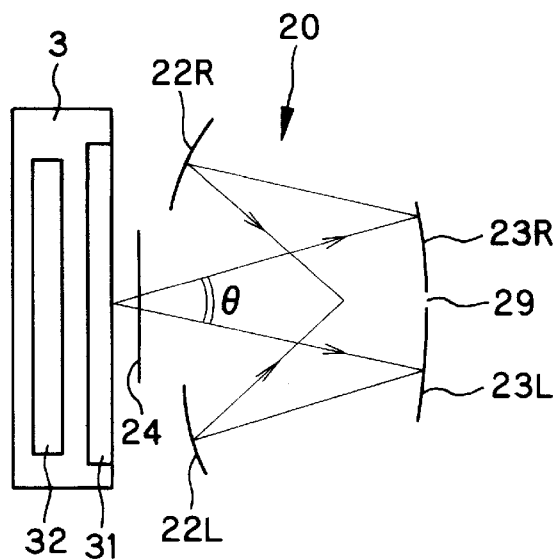
FIG. 9 is a diagram for describing an image display device usable in the present invention, together with a distributed light reinforcing member and an anti-reflection member for the image display device.
Figure 9B:
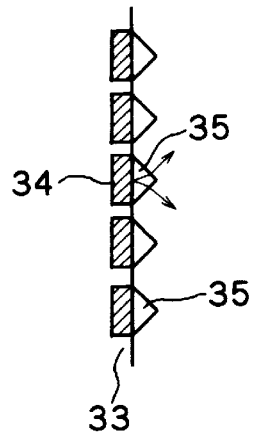
Figure 9C:
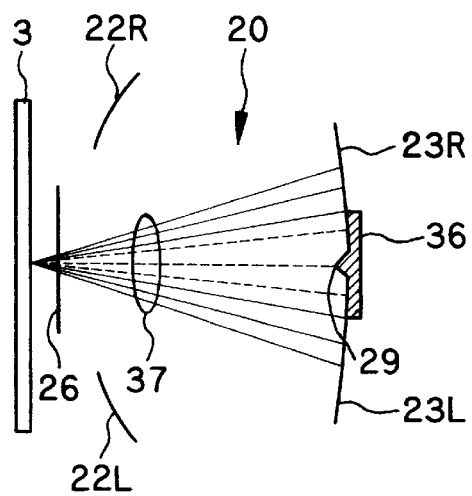

When an image display device 33 having a small exit angle of display light is used as the image display device 3, as shown in part (b) of FIG. 9, it is desirable to place a light beam distributing microprism 35 in correspondence to each pixel 34. The light beam distributing microprism 35 has a sectional configuration as shown in the figure by way of example to serve as a distributed light reinforcing member whereby the exit angle of display light emitted from each pixel 34 is increased in the directions of the left and right optical paths. In place of the light beam distributing microprism 35, a transmission type diffraction grating arranged to weaken the intensity of zeroth-order transmitted light and to intensify ±1st-order diffracted light may be positioned in close proximity to the display surface of the image display device 3.

Incidentally, if a display light beam emitted from the image display device 3 impinges on a boundary portion 29 between the left and right reflecting surfaces 23L and 23R (Examples 1 to 4 and 6) of the optical path distributing prism 20 or between the left and right reflecting surfaces 23'L and 23'R (Example 5) of the optical path distributing mirror member 20', which are positioned closest to the image display device 3 among the reflecting surfaces in the left and right optical paths, the light beam may be reflected from the boundary portion 29 to become ghost light. Therefore, it is desirable that, as shown in part (c) of FIG. 9, the boundary portion 29 and its vicinities should be coated with a black paint or subjected to a diffusion treatment to form an anti-reflection member 36 for preventing such reflection, thereby absorbing or diffusing a light beam portion (shown by the broken lines) of the display light beam 37 from the image display device 3 that is incident on the boundary portion 29. It should be noted that light beam portions of the display light beam 37 that are shown by the solid lines are led to the left and right optical paths as light beams effectively used for the display.

Incidentally, it is possible to form a stationary or portable image display apparatus allowing observation with both eyes by properly supporting the above-described viewing optical system.

Figure 10:
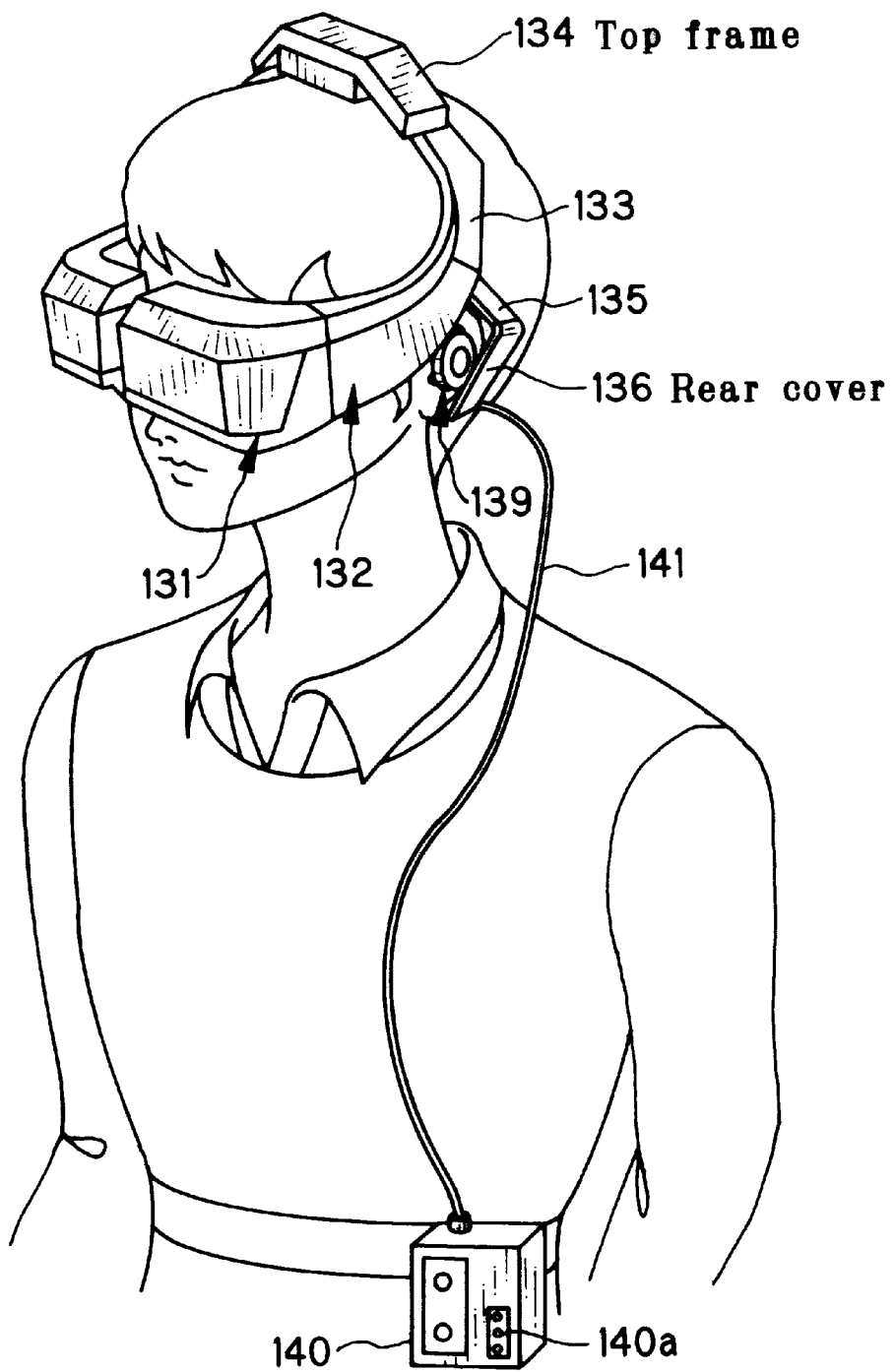
FIG. 10 is a diagram showing the arrangement of the image display apparatus according to the present invention as designed to be fitted for both eyes.

FIG. 10 shows the arrangement of the image display apparatus designed to be fitted for both eyes. In FIG. 10, reference numeral 131 denotes a display apparatus body unit, which is fixed by a support member through the observer's head so that the display apparatus body unit 131 is held in front of both the observer's eyes. The support member has a pair of front frames 132 (left and right) each joined at one end thereof to the display apparatus body unit 131. The left and right front frames 132 extend from the observer's temples to the upper portions of his/her ears, respectively. A pair of rear frames 133 (left and right) are joined to the other ends of the front frames 132, respectively, and extend over the side portions of the observer's head. The support member further has a top frame 134 joined at both ends thereof to the other ends of the left and right rear frames 133, respectively, so that the top frame 134 supports the top of the observer's head.

A rear plate 135 is joined to one front frame 132 near the joint to the rear frame 133. The rear plate 135 is formed from an elastic member, e.g. a metal leaf spring. A rear cover 136, which constitutes a part of the support member, is joined to the rear plate 135 so that the rear cover 136 can support the apparatus at a position behind the observer's ear in a region extending from the back part of the head to the base of the neck. A speaker 139 is mounted inside the rear plate 135 or the rear cover 136 at a position corresponding to the observer's ear.

A cable 141 for transmitting external image and sound signals is led out from the display apparatus body unit 131. The cable 141 extends through the top frame 134, the rear frames 133, the front frames 132 and the rear plate 135 and projects to the outside from the rear end of the rear plate 135 or the rear cover 136. The cable 141 is connected to a video-replaying unit 140. It should be noted that reference numeral 140a in the figure denotes a switch and volume control part of the video-replaying unit 140.

The cable 141 may have a jack and plug arrangement attached to the distal end thereof so that the cable 141 can be connected to an existing video deck or the like. The cable 141 may also be connected to a TV signal-receiving tuner so as to enable the user to enjoy watching TV. Alternatively, the cable 141 may be connected to a computer to receive computer graphic images or message images or the like from the computer. To eliminate the bothersome cord, the apparatus may be arranged to receive external radio signals through an antenna connected thereto.

As will be clear from the foregoing description, the present invention allows observation of the image of a single image display device with both eyes. Accordingly, the costs can be reduced extremely. Further, because three-dimensionally decentered free-form surfaces having no plane of symmetry are used in the optical path distributing part for distributing the image to the two eyes, complicated decentration aberrations due to the three-dimensionally decentered arrangement can be corrected favorably. Further, because no half-mirror is used, a bright image can be observed. Because the optical path distributing part is three-dimensionally decentered, it is possible to provide a display apparatus allowing observation of the image of a single image display device with two eyes at a very wide field angle. Because the left and right final reflecting surfaces of the optical path distributing part, which are closest to the image display device among the reflecting surfaces in the left and right optical paths, can be disposed adjacent to each other in the vertical direction of the observer, it becomes possible to minimize the principal ray tilt angle. In addition, the rotation of the image about the axial principal ray due to the three-dimensionally decentered optical path can be corrected by rotating the image display device in such a manner as to cancel the image rotation.

What we claim is:

1. An image display apparatus having a three-dimensionally decentered optical path, said image display apparatus comprising:

an image display device for forming an image for observation on an image display area; and a viewing optical system for leading the image formed by said image display device to a pupil corresponding to a position where an eyeball of an observer is to be placed;

said image display device being a single image display device having a plurality of pixels juxtaposed on a single substrate;

wherein each pixel located at least in a central portion of said single image display device is arranged to emit an image light beam at such an exit angle that the light beam can be led to left and right eyes of the observer;

said viewing optical system including at least:
- a left ocular part for leading the light beam to the left eye of the observer;
- a right ocular part for leading the light beam to the right eye of the observer; and
- an optical path distributing part for distributing the image light beam emitted from said image display device at said exit angle to said left ocular part and said right ocular part;

said left ocular part having at least two reflecting surfaces, wherein at least one of said at least two reflecting surfaces is formed from a rotationally asymmetric curved reflecting surface having a function of correcting decentration aberrations;

said right ocular part having at least two reflecting surfaces, wherein at least one of said at least two reflecting surfaces is formed from a rotationally asymmetric curved reflecting surface having a function of correcting decentration aberrations;

said optical path distributing part having at least one pair of reflecting surfaces for left and right optical paths for the left and right eyes of the observer, wherein said reflecting surfaces are each formed from a rotationally asymmetric curved reflecting surface having a function of correcting decentration aberrations;

wherein the left and right optical paths of said viewing optical system are formed by optical surfaces arranged so that the left and right optical paths are not in plane symmetry with each other but in 180-degree rotational symmetry with respect to only a normal line passing through a center of said image display device.

2. An image display apparatus according to claim 1, wherein said optical path distributing part has at least two pairs of reflecting surfaces for the left and right optical paths, wherein said at least two pairs of reflecting surfaces have rotationally asymmetric curved reflecting surfaces having a function of correcting decentration aberrations.

3. An image display apparatus according to claim 1, wherein said left and right optical paths for the left and right eyes are arranged so that a plane defined by an optical axis of an axial principal ray incident on a left first reflecting surface closest to said image display device among left reflecting surfaces in the left optical path of said optical path distributing part and the axial principal ray exiting the left first reflecting surface is not identical with a plane defined by an optical axis of an axial principal ray incident on a right first reflecting surface closest to said image display device among right reflecting surfaces in the right optical path of said optical path distributing part and the axial principal ray exiting the right first reflecting surface.

4. An image display apparatus according to claim 1, wherein a left first reflecting surface closest to said image display device among reflecting surfaces in the left optical path of said optical path distributing part and a right first reflecting surface closest to said image display device among reflecting surfaces in the right optical path of said optical path distributing part are positioned to face said image display device and disposed adjacent to each other in a direction perpendicular to a plane containing centers of exit pupils of the left and right optical paths of said viewing optical system and also containing the center of said image display device.

5. An image display apparatus according to claim 4, wherein an anti-reflection member is provided for an area including a boundary portion between said left first reflecting surface and said right first reflecting surface to prevent light rays emitted perpendicularly from a central region of said image display device from being reflected as ghost light.

6. An image display apparatus according to claim 1, wherein said viewing optical system is formed from a prism member, wherein all of said reflecting surfaces are back-coated reflecting surfaces formed on surfaces of said prism member.

7. An image display apparatus according to claim 1, wherein said viewing optical system includes:
- an optical path distributing prism constituting said optical path distributing part;
- a left ocular prism constituting said left ocular part; and
- a right ocular prism constituting said right ocular part;
- wherein said left ocular prism and said right ocular prism are separated from said optical path distributing prism by an air space.

8. An image display apparatus according to claim 7, wherein said optical path distributing prism includes at least:
- an entrance surface disposed to face said image display device so that both an image light beam forming the left optical path for the left eye and an image light beam forming the right optical path for the right eye enter said optical path distributing prism through said entrance surface;
- a left exit surface through which the light beam of said left optical path exits said optical path distributing prism;
- at least two left reflecting surfaces disposed in an optical path between said entrance surface and said left exit surface to reflect the light beam of said left optical path within said optical path distributing prism;
- a right exit surface through which the light beam of said right optical path exits said optical path distributing prism; and
- at least two right reflecting surfaces disposed in an optical path between said entrance surface and said right exit surface to reflect the light beam of said right optical path within said optical path distributing prism;
- wherein a reflecting surface closest to said entrance surface in said left optical path and a reflecting surface closest to said entrance surface in said right optical path are positioned so as to face both said image display device and said entrance surface and disposed adjacent to each other in a direction perpendicular to a plane containing centers of exit pupils of the left and right optical paths of said viewing optical system and also containing the center of said image display device.

9. An image display apparatus according to claim 1, wherein a distributed light reinforcing member is disposed between said image display device and said optical path distributing part so that a light intensity of an image light beam emitted at a predetermined exit angle from each pixel located at least in the central portion of said single image display device is made higher by said distributed light reinforcing member than an intensity of a light beam emitted in a direction perpendicular to a display surface of said image display device.

10. An image display apparatus according to claim 7, wherein said left ocular prism has:
- a first surface as an entrance surface through which a light beam exiting said optical path distributing prism enters said prism;

a second surface as a reflecting surface for reflecting the light beam entering through the first surface and totally reflected from a third surface within said prism so that the light beam reflected from the second surface is incident on the third surface at an angle smaller than a total reflection critical angle; and the third surface arranged so that the light beam entering said prism through the first surface is incident on the third surface at an angle not smaller than the total reflection critical angle so as to be totally reflected therefrom, and, at the same time, the third surface is an exit surface through which the light beam reflected from the second surface exits said prism; and wherein said right ocular prism has:
   a first surface as an entrance surface through which a light beam exiting said optical path distributing prism enters said prism;
   a second surface as a reflecting surface for reflecting the light beam entering through the first surface and totally reflected from a third surface within said prism so that the light beam reflected from the second surface is incident on the third surface at an angle smaller than a total reflection critical angle; and
   the third surface arranged so that the light beam entering said prism through the first surface is incident on the third surface at an angle not smaller than the total reflection critical angle so as to be totally reflected therefrom, and, at the same time, the third surface is an exit surface through which the light beam reflected from the second surface exits said prism.

11. An image display apparatus according to claim 10, wherein the first surface of said left ocular prism is formed with a rotationally asymmetric curved surface configuration that corrects decentration aberrations, and the first surface of said right ocular prism is formed with a rotationally asymmetric curved surface configuration that corrects decentration aberrations.

12. An image display apparatus according to claim 10, wherein the second surface of said left ocular prism is formed with a rotationally asymmetric curved surface configuration that corrects decentration aberrations, and the second surface of said right ocular prism is formed with a rotationally asymmetric curved surface configuration that corrects decentration aberrations.

13. An image display apparatus according to claim 10, wherein said left ocular prism is arranged so that a left axial principal ray exiting said optical path distributing prism intersects, at a desired angle, a plane defined by the left axial principal ray exiting said left ocular prism and a right axial principal ray exiting said right ocular prism, and wherein said right ocular prism is arranged so that a right axial principal ray exiting said optical path distributing prism intersects, at a desired angle, a plane defined by the left axial principal ray exiting said left ocular prism and the right axial principal ray exiting said right ocular prism.

14. An image display apparatus according to claim 7, wherein said left ocular prism has:
   a first surface as an entrance surface through which a light beam exiting said optical path distributing prism enters said prism;
   a second surface as a reflecting surface for reflecting the light beam entering said prism through the first surface;
   a third surface as a reflecting surface for reflecting the reflected light beam from the second surface within said prism; and
   a fourth surface as an exit surface through which the light beam reflected from the third surface exits said prism;

wherein said right ocular prism has:
   a first surface as an entrance surface through which a light beam exiting said optical path distributing prism enters said prism;
   a second surface as a reflecting surface for reflecting the light beam entering said prism through the first surface;
   a third surface as a reflecting surface for reflecting the reflected light beam from the second surface within said prism; and
   a fourth surface as an exit surface through which the light beam reflected from the third surface exits said prism; and wherein when an optical path in said left ocular prism and an optical path in said right ocular prism are projected onto a plane containing centers of exit pupils of the left and right optical paths of said viewing optical system and also containing the center of said image display device, the optical path in each of the ocular prisms rotates within the prism in such a manner as to intersect itself.

15. An image display apparatus according to claim 14, wherein the second surface of said left ocular prism is formed with a rotationally asymmetric curved surface configuration that corrects decentration aberrations, and the second surface of said right ocular prism is formed with a rotationally asymmetric curved surface configuration that corrects decentration aberrations.

16. An image display apparatus according to claim 14, wherein the third surface of said left ocular prism is formed with a rotationally asymmetric curved surface configuration that corrects decentration aberrations, and the third surface of said right ocular prism is formed with a rotationally asymmetric curved surface configuration that corrects decentration aberrations.

17. An image display apparatus according to claim 14, wherein said left ocular prism is arranged so that a left axial principal ray exiting said optical path distributing prism intersects, at a desired angle, a plane defined by the left axial principal ray exiting said left ocular prism and a right axial principal ray exiting said right ocular prism, and wherein said right ocular prism is arranged so that a right axial principal ray exiting said optical path distributing prism intersects, at a desired angle, a plane defined by the left axial principal ray exiting said left ocular prism and the right axial principal ray exiting said right ocular prism.

18. An image display apparatus according to claim 1, wherein said viewing optical system forms an intermediate image of the image displayed by said image display device in said right optical path and also forms an intermediate image of the image displayed by said image display device in said left optical path.

19. An image display apparatus according to claim 10, wherein said viewing optical system forms an intermediate image of the image displayed by said image display device in said right optical path and also forms an intermediate image of the image displayed by said image display device in said left optical path.

20. An image display apparatus according to claim 14, wherein said viewing optical system forms an intermediate image of the image displayed by said image display device in said right optical path and also forms an intermediate image of the image displayed by said image display device in said left optical path.

21. An image display apparatus according to claim 1, wherein said image display device is rotated through a desired angle about the normal line passing through the center of said image display device as an axis of rotation so that a horizontal direction of the image display area of said image display device is at an angle to a plane containing centers of exit pupils of the left and right optical paths of said viewing optical system and also containing the center of said image display device.

22. An image display apparatus according to claim 10, wherein said image display device is rotated through a desired angle about the normal line passing through the center of said image display device as an axis of rotation so that a horizontal direction of the image display area of said image display device is at an angle to a plane containing centers of exit pupils of the left and right optical paths of said viewing optical system and also containing the center of said image display device.

23. An image display apparatus according to claim 14, wherein said image display device is rotated through a desired angle about the normal line passing through the center of said image display device as an axis of rotation so that a horizontal direction of the image display area of said image display device is at an angle to a plane containing centers of exit pupils of the left and right optical paths of said viewing optical system and also containing the center of said image display device.

24. An image display apparatus according to claim 1, wherein the following condition is satisfied:

$$10° < \theta < 120° \tag{1}$$

where $\theta$ is an angle formed between axial principal rays of left and right light beams led from each pixel located at least in the central portion of said image display device to the left and right eyes of the observer.

25. An image display apparatus according to claim 10, wherein the following condition is satisfied:

$$10° < \theta < 120° \tag{1}$$

where $\theta$ is an angle formed between axial principal rays of left and right light beams led from each pixel located at least in the central portion of said image display device to the left and right eyes of the observer.

26. An image display apparatus according to claim 14, wherein the following condition is satisfied:

$$10° < \theta < 120° \tag{1}$$

where $\theta$ is an angle formed between axial principal rays of left and right light beams led from each pixel located at least in the central portion of said image display device to the left and right eyes of the observer.

27. An image pickup apparatus comprising:
   said image display apparatus according to any one of claims 1 to 4, 6, 7, 9, 19 and 21; and
   an image pickup device provided in place of said image display device;
   wherein said exit pupils are arranged as entrance pupils through which a light beam from a subject passes, and a subject image is formed on said image pickup device.

28. A projection apparatus comprising:
   said image display apparatus according to any one of claims 1 to 4, 6, 7, 9, 19 and 21;
   a projection object provided in place of said image display device; and
   a screen placed in front of said exit pupils to form a projected image of said projection object on said screen.

* * * * *